(12) United States Patent
Kuwabara

(10) Patent No.: US 12,474,650 B2
(45) Date of Patent: Nov. 18, 2025

(54) DRUM UNIT AND IMAGE FORMATION APPARATUS

(71) Applicant: Oki Electric Industry Co., Ltd., Tokyo (JP)

(72) Inventor: Hideharu Kuwabara, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 14 days.

(21) Appl. No.: 18/765,337

(22) Filed: Jul. 8, 2024

(65) Prior Publication Data

US 2025/0076779 A1  Mar. 6, 2025

(30) Foreign Application Priority Data

Aug. 30, 2023  (JP) .................. 2023-139793

(51) Int. Cl.
- *G03G 15/02* (2006.01)
- *G03G 15/16* (2006.01)

(52) U.S. Cl.
CPC ..... *G03G 15/0266* (2013.01); *G03G 15/1675* (2013.01); *G03G 2215/025* (2013.01)

(58) Field of Classification Search
CPC .... G03G 15/02; G03G 15/0266; G03G 15/04; G03G 15/043; G03G 15/5033; G03G 15/5037; G03G 2215/00025; G03G 2215/00071

See application file for complete search history.

(56) References Cited

U.S. PATENT DOCUMENTS

| | | | |
|---|---|---|---|
| 2018/0011427 A1* | 1/2018 | Abe | G03G 15/5037 |
| 2018/0101108 A1* | 4/2018 | Yaguchi | G03G 15/5037 |
| 2019/0179246 A1* | 6/2019 | Kaneko | G03G 15/5041 |
| 2024/0094669 A1* | 3/2024 | Kogiso | G03G 15/5016 |

FOREIGN PATENT DOCUMENTS

JP  2020-160292 A  10/2020

* cited by examiner

*Primary Examiner* — Thomas S Giampaolo, II
(74) *Attorney, Agent, or Firm* — METROLEX IP LAW GROUP, PLLC; Robert L. Scott, Esq.

(57) ABSTRACT

A drum unit including a photosensitive drum may satisfy an equation of $\Delta V \leq 0.489 \times Q - 0.014$ (%), where $\Delta V = \{1-(V1/V0)\} \times 100$ (%). V0 is a surface potential of the photosensitive drum that is measured under a first condition that exposes a surface of the photosensitive drum at an exposure amount Q in a range of 0.13 to 0.34 µJ/cm2 while the photosensitive drum is rotated at a circumferential speed of 151 mm/s with the surface of the photosensitive drum being charged with a voltage having 1000 volts and a first polarity. V1 is a surface potential of the photosensitive drum that is measured under the first condition again after the surface of the photosensitive drum is applied for 406 seconds with a voltage having 2850 volts and a second polarity while the photosensitive drum is rotated at the circumferential speed of 73 mm/s.

8 Claims, 11 Drawing Sheets

FIG. 4A
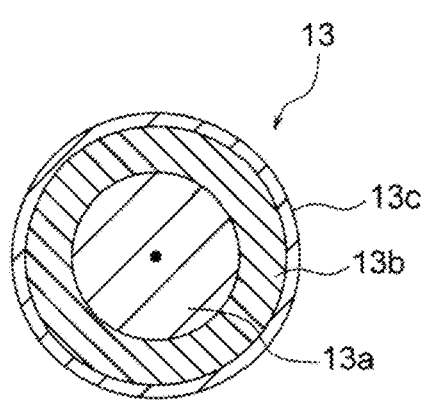
FIG. 4B
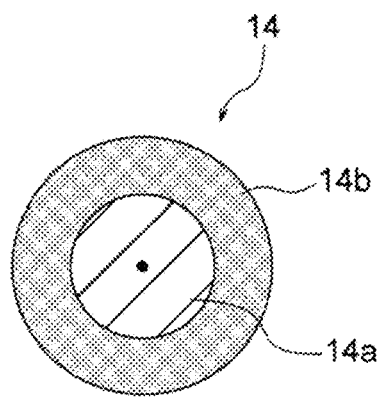
FIG. 5A
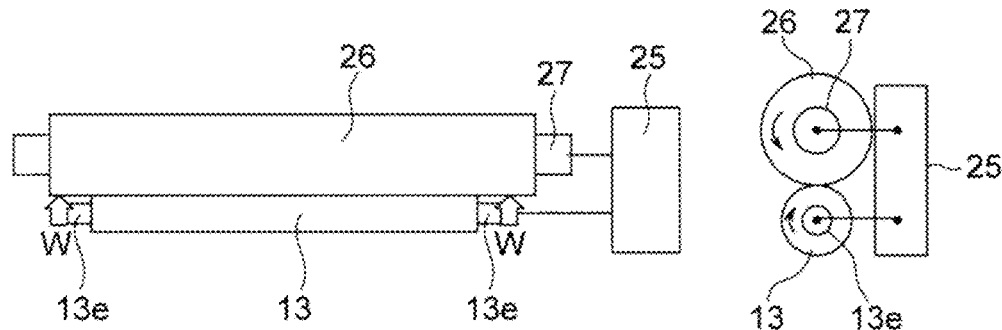
FIG. 5B
FIG. 6A
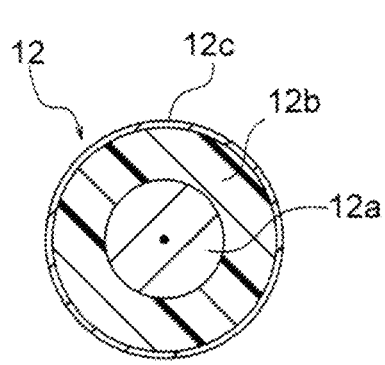
FIG. 6B
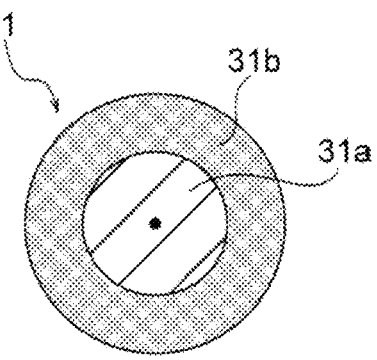

FIG. 13

| EXPOSURE AMOUNT (μJ/cm²) | LIGHT ATTENUATION CHANGE RATE | | | | | | | | | | |
|---|---|---|---|---|---|---|---|---|---|---|---|
| | EXAMPLE 1 | EXAMPLE 2 | EXAMPLE 3 | EXAMPLE 4 | EXAMPLE 5 | COMPARATIVE EXAMPLE 1 | COMPARATIVE EXAMPL 2 | COMPARATIVE EXAMPLE 3 | COMPARATIVE EXAMPLE 4 | COMPARATIVE EXAMPLE 5 |
| 0.13 | 1.9% | 2.5% | 3.1% | 4.7% | 4.8% | 9.4% | 8.4% | 8.5% | 7.7% | 9.5% |
| 0.20 | 3.7% | 4.0% | 6.7% | 6.7% | 8.0% | 15.1% | 15.0% | 13.9% | 15.1% | 15.6% |
| 0.27 | 4.8% | 5.2% | 10.6% | 9.2% | 12.0% | 18.8% | 21.0% | 18.4% | 26.6% | 25.5% |
| 0.34 | 6.5% | 7.0% | 14.6% | 12.5% | 15.2% | 18.3% | 22.3% | 19.3% | 35.0% | 41.0% |
| DENSITY STEP IN HALFTONE | EXCELLENT | EXCELLENT | GOOD | GOOD | GOOD | POOR | POOR | POOR | POOR | POOR |

DRUM UNIT AND IMAGE FORMATION APPARATUS

CROSS REFERENCE TO RELATED APPLICATIONS

This application claims priority based on 35 USC 119 from prior Japanese Patent Application No. 2023-139793 filed on Aug. 30, 2023, entitled "DRUM UNIT AND IMAGE FORMATION APPARATUS", the entire contents of which are incorporated herein by reference.

BACKGROUND

The disclosure may relate to a drum unit including a photosensitive drum, and an image formation apparatus with the drum unit.

In an image formation apparatus utilizing an electronic process, a surface of a photosensitive drum is charged and then exposed with light, so that an electrostatic latent image is formed on the surface of the photosensitive drum. The electrostatic latent image is developed with a developer to become a developer image. A medium is conveyed to pass between the photosensitive drum and a transfer member arranged opposite to the photosensitive drum. A transfer voltage is applied to the transfer member, the developer image on the photosensitive drum is transferred to the medium.

In a case of printing the developer image on the medium that has a narrow width and high volume resistivity, in a region (out-of-medium region) outside a region (a medium-contact region, or a medium region) where the medium contacts the photosensitive drum, the transfer member may contact the photosensitive drum, which causes current to flow from the transfer member to the photosensitive drum.

With this, charges having a polarity opposite to the charge potential is accumulated on the surface of the photosensitive drum. Accordingly, a printing defect called a strong transfer history may occur when printing on a subsequent medium.

In order to reduce such a printing defect, Patent Document 1 (Japanese Patent Application Publication No. 2020-160292) proposes performing exposure processing that increases an absolute value of the surface potential of the photosensitive drum in the region (the out-of-medium region) outside the region (the medium-contact region) where the medium contacts the photosensitive drum.

Patent Document 1: Japanese Patent Application Publication No. 2020-160292.

SUMMARY

However, in such a proposed technology, it may be difficult to deal with various types of media such as continuous medium (perforated medium), irregular shape medium, and the like.

An object of an embodiment of the disclosure may be to provide a technology that can handle a variety of media and can suppress an occurrence of a printing defect.

An aspect of the disclosure may be a drum unit that may include a photosensitive drum and a frame that holds the photosensitive drum. An equation of $\Delta V \leq 0.489 \times Q - 0.014$ (%) is satisfied, where $\Delta V = \{1-(V1/V0)\} \times 100(\%)$. V0 is a surface potential of the photosensitive drum that is measured under a first condition, the first condition being to expose a surface of the photosensitive drum at an exposure amount Q of a range of 0.13 to 0.34 μJ/cm2 while the photosensitive drum is rotated at the circumferential speed of 151 mm/s with the surface of the photosensitive drum being charged with a voltage having an absolute value of 1000 volts and a first polarity. V1 is a surface potential of the photosensitive drum that is measured under the first condition again after the surface of the photosensitive drum that has been measured under the first condition is applied for 406 seconds with a voltage having an absolute value of 2850 volts and a second polarity opposite to the first polarity while the photosensitive drum is rotated at the circumferential speed of 73 mm/s.

According to the aspect, it is possible to handle a variety of media and to suppress an occurrence of a printing defect.

BRIEF DESCRIPTION OF DRAWINGS

FIG. 4A is diagram illustrating a cross-sectional structure of a development roller according to an embodiment and FIG. 4B is diagram illustrating a cross-sectional structure of a supply roller according to an embodiment;

FIGS. 5A and 5B are schematic diagrams illustrating a method for measuring a resistance of a development roller according to an embodiment;

FIGS. 6A and 6B are diagrams illustrating a cross-sectional structure of a charging roller and a cross-sectional structure of a development roller according to an embodiment;

FIG. 13 is a table illustrating evaluation results of the light attenuation change rate and an occurrence of a step in density level (a density step) with the exposure amount on the photosensitive drum varied according to Examples 1 to 5 and Comparative Examples 1 to 5;

DETAILED DESCRIPTION

Figure 1:
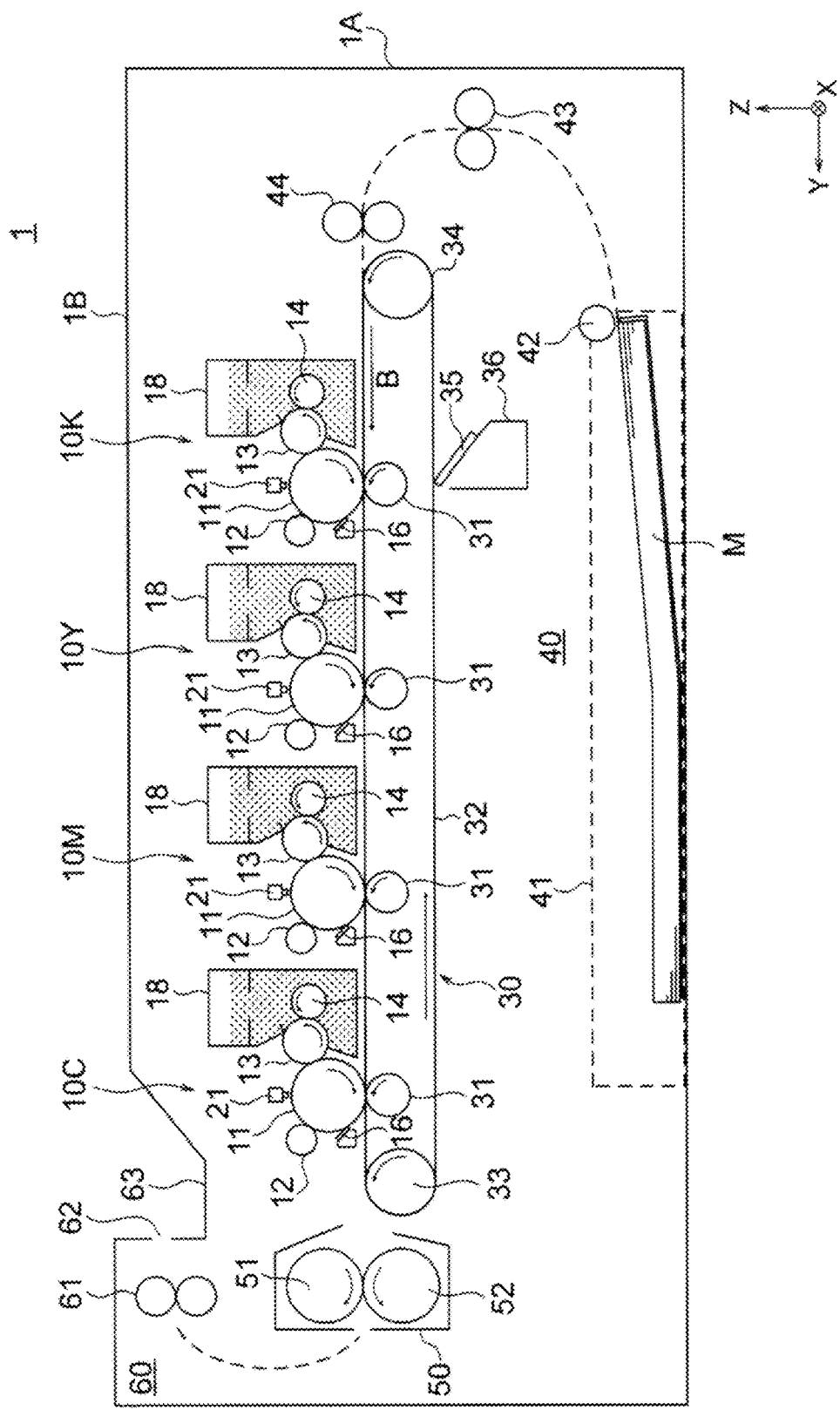
FIG. 1 is a diagram illustrating a configuration of an image formation apparatus according to an embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

(Configuration of Image Formation Apparatus)

First, an image formation apparatus according to an embodiment is described. FIG. 1 is a diagram illustrating a view of an image formation apparatus 1 according to an embodiment. The image formation apparatus 1 is configured to form a color image by an electrophotographic method, and is, for example, a color printer. Note that the image formation apparatus 1 is not limited to the color printer and may be a monochrome printer.

The image formation apparatus 1 includes a medium supply unit 40 configured to supply a medium M such as a printing paper or the like, image formation units 10K, 10Y, 10M, and 10C configured to form toner images (developer images) of black (K), yellow (Y), magenta (M), and cyan (C), a transfer unit 30 configured to transfer the toner images to the medium M, a fixation device 50 configured to fix the toner images to the medium M, and a media discharge unit 60 configured to discharge the medium M.

The medium supply unit 40 includes a media tray 41, a hopping roller 42, a pair of regist rollers 43, and a pair of conveyance rollers 44. The media tray 41 accommodates the media M in a stacked state. The media M are, for example, printing paper, an OHP sheet (overhead projector sheet), an envelope, copy paper, special paper, etc. The printing paper includes plain paper, coated paper (for example, waterproof paper), and the like.

The hopping roller 42 is rotated by a driving force of a conveyance motor 45 (FIG. 8), and feeds the media M from the media tray 41 to a conveyance path one by one. The pair of resist rollers 43 are rotated by the driving force of the conveyance motor 45 (FIG. 8), and conveys the medium M along the conveyance path. The pair of resist rollers 43 correct a skew of the medium M when the leading end of the medium M comes in contact with a nip between the rollers 43, and then starts rotating at a predetermined time after the leading end of the medium M comes in contact with the nip between the rollers 43 so as to convey the medium M. The pair of conveyance rollers 44 are rotated by the driving force of the conveyance motor 45 (FIG. 8), and conveys the medium M to the transfer unit 30.

The image formation units 10K, 10Y, 10M, and 10C serving as image formation parts or image formation devices are arranged along the conveyance path from the upstream side to the downstream side, that is, from the right side to the left side in FIG. 1. The image formation units 10K, 10Y, 10M, and 10C may be referred to as image formation units 10 when there is no need to distinguish between them.

An exposure head 21 as an exposure device is located so as to be opposed to a photosensitive drum 11 (described later) of each of the image formation units 10. The exposure head 21 has a plurality of LEDs (light emitting diodes) as light emitting elements arranged in an axial direction of the photosensitive drum 11 and irradiates a surface of the photosensitive drum 11 with light. The exposure heads 21 are suspended and supported by a top cover 1B that covers an upper portion of a housing 1A of the image formation apparatus. Also, laser elements may be used instead of the LEDs.

(Configuration of Image Formation Unit)

Figure 2:
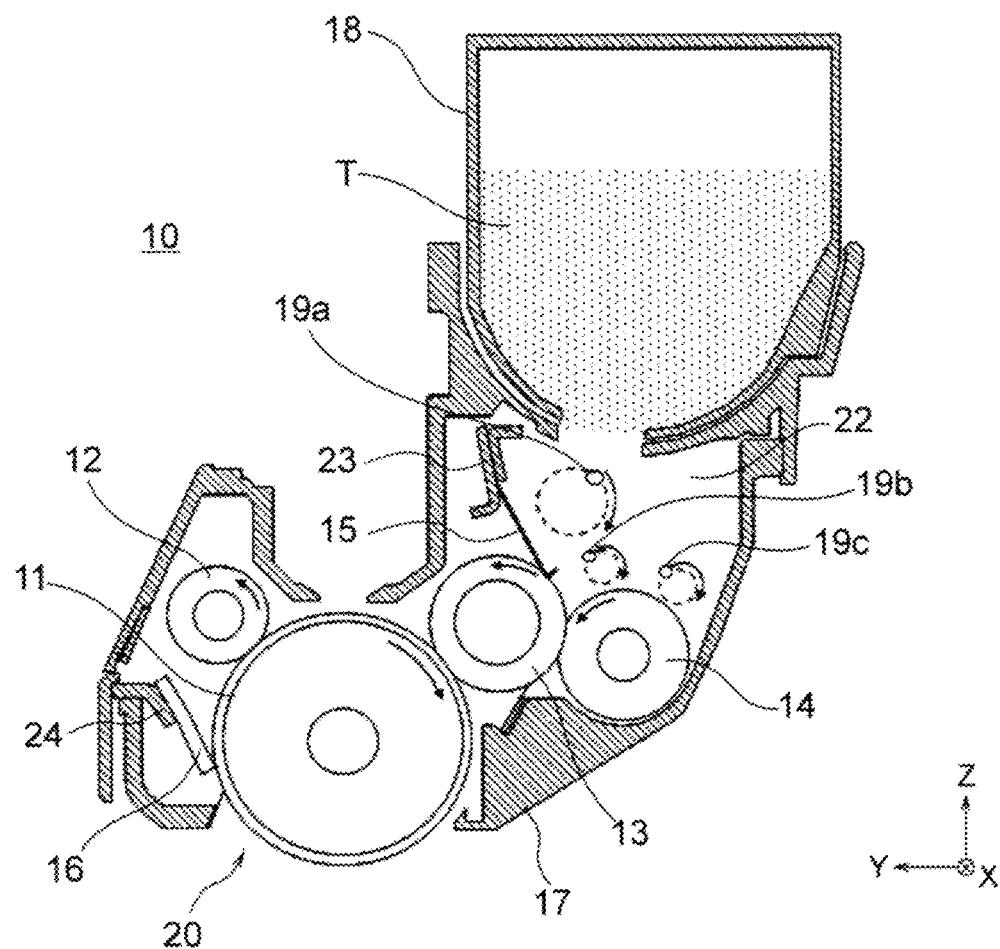
FIG. 2 is a diagram illustrating a configuration of an image formation unit according to an embodiment.

FIG. 2 is a diagram illustrating a configuration of the image formation unit 10. The image formation unit 10 includes the photosensitive drum 11 as an image carrier, a charging roller 12 as a charging member, a development roller 13 as a developer carrier, a supply roller 14 as a supply member, a development blade 15 as a layer regulation member, a cleaning member 16, and a frame 17 accommodating therein these elements. On an upper part of the frame 17, a toner cartridge 18 serving as a developer container is mounted.

In the above configuration, the photosensitive drum 11 and the frame 17 that holds the photosensitive drum 11 constitute a drum unit 20. The drum unit 20 and the charging roller 12 may be collectively referred to as a charging device.

The photosensitive drum 11 is a cylindrical member including a conductive support and a photosensitive layer formed on a surface of the conductive support. The photosensitive drum 11 is configured to rotate about a rotation axis thereof in the clockwise direction in FIG. 1. The photosensitive drum 11 is configured to carry the electrostatic latent image on the surface thereof. The photosensitive drum 11 will be described in detail later.

The charging roller 12 is disposed in contact with the surface of the photosensitive drum 11 and is configured to rotate along with the rotation of the photosensitive drum 11. The charging roller 12 is applied with a charging voltage from a power supply 131 (FIG. 8) for the charging roller to uniformly charge the surface of the photosensitive drum 11.

The development roller 13 is disposed in contact with the surface of the photosensitive drum 11 and configured to rotate in a direction opposite to that of the photosensitive drum 11 (that is, at a contact portion between the development roller 13 and the photosensitive drum 11, the direction in which the surface of the development roller 13 moves is the same as the direction in which the surface of the photosensitive drum 11 moves). The development roller 13 is applied with a development voltage from a power supply 132 (FIG. 8) for the development roller and configured to develop the electrostatic latent image on the surface of the photosensitive drum 11 with the toner (developer).

The supply roller 14 is located in contact with the surface of the development roller 13 and rotates in the same direction as the development roller 1 (that is, at a contact portion between the supply roller 14 and the development roller 13, the direction in which the surface of the supply roller 14 moves is opposite to the direction in which the surface of the development roller 13 moves). The supply roller 14 is applied with a supply voltage from a power supply 133 (FIG. 8) for the supply roller and supplies the toner to the development roller 13.

The development blade 15 is a blade located in contact with the surface of the development roller 13. The development blade 15 is applied with a blade voltage from a power supply 134 (FIG. 8) for the development blade and regulates the toner layer on the surface of the development roller 13 to a constant thickness.

The cleaning member 16 is provided in contact with the surface of the photosensitive drum 11 and removes the toner remaining on the surface of the photosensitive drum 11. The waste toner removed by the cleaning member 16 is transported to a waste toner collection section by a transport screw (not illustrated).

The frame 17 is a housing that forms an outer shell of the Image formation unit 10. Within the frame 17, an area in which the development roller 13, the supply roller 14, and the development blade 15 are arranged is a toner storage 22 that stores toner. In the toner storage 22, crank-shaped agitating bars 19a, 19b, and 19c are arranged in addition to the development roller 13, the supply roller 14, and the development blade 15 and agitates and transports the toner T.

On an upper part of the frame 17 of the image formation unit 10, a toner cartridge 18 as a developer storage is detachably mounted. The toner cartridge 18 is a container that stores therein the toner (indicated by symbol T) as a developer, and supplies the toner to the toner storage 22.

As illustrated in FIG. 1, the transfer unit 30 includes four transfer rollers 31 as transfer members provided so as to be respectively opposed to the photosensitive drums 11 of the image formation units 10, a transfer belt 32 configured to pass between the photosensitive drums 11 and the transfer rollers 31, and a drive roller 33 and a driven roller 34 between which the transfer belt 32 is stretched.

The transfer unit 30 also includes a belt cleaning member 35 that removes the residual toner remaining on the transfer belt 32 and a waste toner storage 36 that stores therein the residual toner removed by the belt cleaning member 35.

The transfer belt 32 is an endless belt made of a highly resistive semi-conductive plastic film. The transfer belt 32 includes a glossy surface, and conveys the medium M with attaching the medium M on the surface of the transfer belt 32.

The drive rollers 33 are driven to be rotated by a driving force of a drive motor 108 (see FIG. 8), to cause the transfer belt 32 to run in a direction indicated by the arrow B. The driven roller 34 applies the tension to the transfer belt 32.

The transfer roller 31 serving as a transfer member or a transfer part includes a semi-conductive elastic layer formed on a surface of a metal shaft. The transfer roller 31 is applied with a transfer voltage from a power supply 135 (FIG. 8) for the transfer roller and configured to transfer the toner image from the surface of the photosensitive drum 11 to the medium M on the transfer belt 32.

Figure 8:
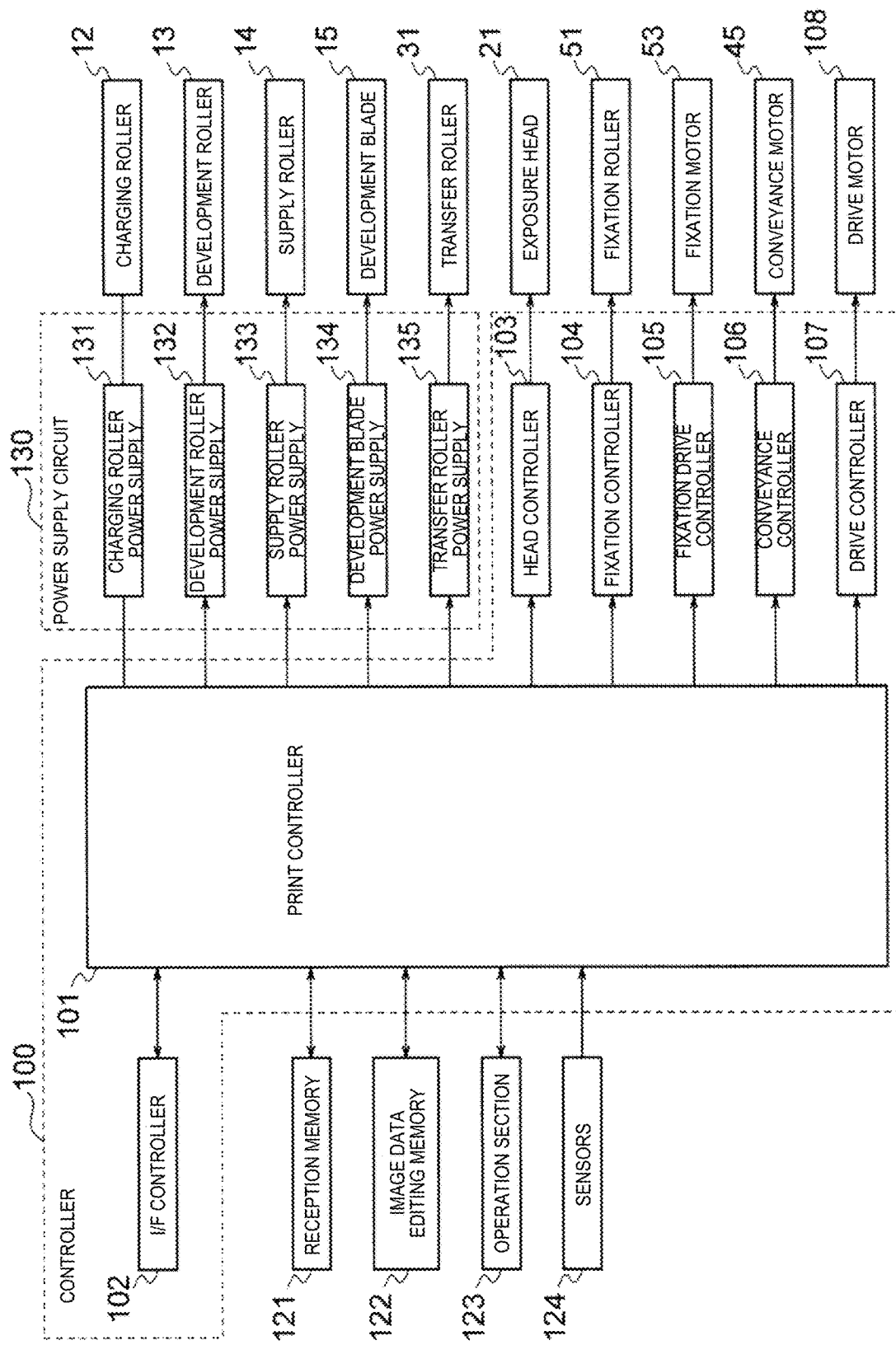
FIG. 8 is a block diagram illustrating a view of a control system of the image formation apparatus according to an embodiment.

The fixation device 50 includes a fixation roller 51 and a pressure roller 52. The fixation roller 51 includes a heater, such as a halogen lamp or the like, built therein. The fixation roller 51 is rotated by a driving force of a fixation motor 53 (FIG. 8).

The pressure roller 52 is in press contact with the fixation roller 51 and thus forms a fixation nip between the pressure roller 52 and the fixation roller 51. The fixation roller 51 and the pressure roller 52 apply pressure and heat on the toner transferred on the medium M, and thereby fix the toner onto the medium M.

The media discharge unit 60 is arranged on the downstream side of the fixation device 50 in the conveyance direction of the medium M. The media discharge unit 60 includes a pair of discharge rollers 61 that discharge the medium M that has passed through the fixation device 50 from a discharge port 62 to the outside of the image formation apparatus. The pair of discharge rollers 61 are driven to rotate by the rotation transmitted from the fixation motor 53 (FIG. 8) so as to discharge the medium M from the discharge port 62. The upper portion of the top cover 1B includes a stacker 63 on which the discharged media M are stacked.

In FIGS. 1 and 2, the axial direction (i.e., the direction of the rotation axis) of the photosensitive drum 11 is the X direction. The X direction is parallel to an axial direction of each of the rollers in the image formation apparatus 1 and also is parallel to a width direction of the medium M being conveyed. A movement direction of the medium M as the medium M passes through the image formation unit 10 is referred to as a Y direction. The direction orthogonal to both the X direction and the Y direction is referred to as a Z direction. Here, the Z direction is the vertical direction.

(Components of Image Formation Unit)

Next, components of the image formation unit 10 is described in more detail.

(Toner)

First, the toner used in the Image formation unit 10 is be explained below. The toner is a non-magnetic one-component negatively-chargeable toner. The toner has an average particle size of approximately 6.0 μm and a circularity of approximately 0.96. For measuring the average particle size, "Multisizer 3" manufactured by Coulter, Inc. is used. For measuring the circularity, a flow type particle image analyzer "FPIA-3000" manufactured by Sysmex Corporation is used.

The toner is obtained by adding external additive such as inorganic fine powder or organic fine powder to toner base particles containing at least binder resin.

It may be preferable that the binder resin is polyester resin, styrene-acrylic resin, epoxy resin, or styrene-butadiene resin. The binder resin may be obtained by mixing multiple types of binder resin. Here, a mixture of two or more types of amorphous polyester resins and a crystalline polyester resin having a crystal structure is used as the binder resin.

A release agent, a coloring agent (colorant), and/or the like are added to the binder resin. In addition to these, additives such as a charge control agent, a conductivity modifier, a fluidity improver, and a cleanability improver may be added.

The release agent is not particularly limited to, but examples of the release agent include low molecular weight polyethylene, low molecular weight polypropylene, olefin copolymer, aliphatic hydrocarbon wax such as microcrystalline wax, paraffin wax, and fischer-tropsch wax, oxide of aliphatic hydrocarbon wax such as oxidized polyethylene wax, or block copolymer thereof, wax whose main component is fatty acid ester such as caranuba wax and montan acid ester wax, partially or completely deoxidized fatty acid ester such as deoxidized carnauba wax, and the like. The content amount of the release agent is preferably 0.1 to 20 parts by weight, more preferably 0.5 to 12 parts by weight, with respect to 100 parts by weight of the binder resin. Also, a plurality of waxes may be used together.

The coloring agent is not particularly limited, but dyes, pigments, and the like generally used as coloring agents for yellow, magenta, cyan, and black toners can be used singly or in combination. Specifically, for example, carbon black, iron oxide, Phthalocyanine Blue, Permanent Brown FG, Brilliant First Scarlet, Pigment Green B, Rhodamine-B base, Solvent Red 49, Solvent Red 146, Pigment Blue 15:3, Solvent Blue 35, Quinacridone, Carmine 6B, Disazo Yellow and the like can be used. The content amount of the coloring agent is preferably 2 to 25 parts by weight, more preferably 2 to 15 parts by weight, added to 100 parts by weight of the binder resin.

As the charge control agent, a known one can be used. In the case of a negatively chargeable toner, the charge control agent is, for example, an azo-complex charge-control agent, a salicylic acid-complex charge-control agent, a calixarene charge-control agent, or the like. The content amount of the charge control agent is preferably 0.05 to 15 parts by weight, more preferably 0.1 to 10 parts by weight, added to 100 parts by weight of the binder resin.

The external additives are added to improve environmental stability, electrification stability, development properties, flowability, and storage stability, and can be a known one.

The content amount of the external additives is 0.01 to 10 parts by weight, preferably 0.05 to 8 parts by weight, to 100 parts by weight of the binder resin. In this example, several types of silica having an average particle size of 14 µm (silica having positive charging polarity and silica having negative charging polarity), and colloidal silica having an average particle size of 110 µm (negative charging polarity) and melamine having an average particle size of 200 µm (positive charging polarity) are added to 100 parts by weight of the base particles, such that the total amount of the external additive is fallen within the above range.

The toner charge amount (blow-off charge amount) is measured after agitating the toner and the carrier by shaking. Here, a ferrite carrier "EF96-35" manufactured by Powdertech Co., Ltd. is used as a carrier, and 0.5 (g) of the toner and 9.5 (g) of the carrier are mixed. 150 mg of the mixture of the toner and the carrier is placed in a container and shaken using a shaker "YS-LD" manufactured by Yayoi Co., Ltd. The shaking speed is 200 times/minute, and the shaking time is 300 seconds.

After the shaking, a suction is performed for 10 seconds using a powder charge amount measuring device "TB-203" manufactured by Kyocera Chemical Co., Ltd., with the blow pressure of 7.0 (kPa) and the suction pressure of −4.5 (kPa), and the charge amount and the suction amount are output every 0.1 seconds to a PC (personal computer). The charge amount Q/M per unit weight of the toner particles calculated from the respective average values of the charge amount and the suction amount output during the last 2 seconds of the suction time (10 seconds) is approximately −35 µC/g. The measurement is performed under a temperature of 25 degrees Celsius (° C.) and a relative humidity of 50%.

(Photosensitive Drum)

Figure 3A:
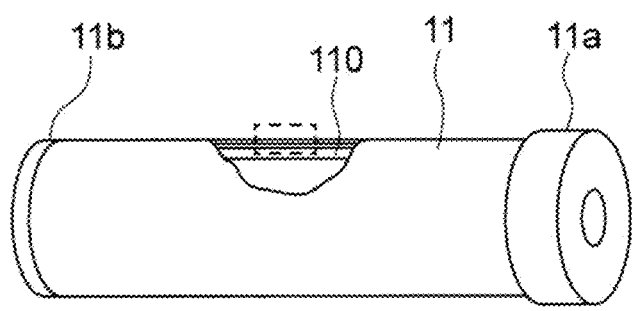
FIGS. 3A and 3B are diagrams illustrating a cross-sectional structure of a photosensitive drum according to an embodiment.
Figure 3B:
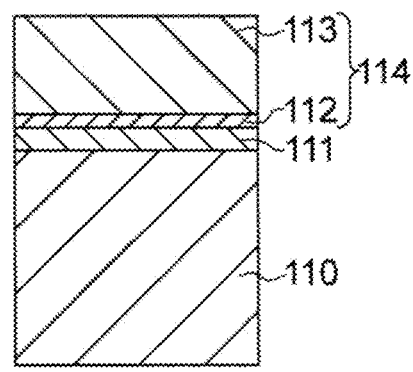

Next, the photosensitive drum 11 is described below. FIG. 3A is a diagram illustrating a cross-sectional structure of the photosensitive drum 11. FIG. 3B is a diagram illustrating an enlarged cross-sectional view of a part of the photosensitive drum 11 illustrated in FIG. 3A.

The photosensitive drum 11 is a member configured to carry on the surface (surface layer portion) thereof an electrostatic latent image. As illustrated in FIG. 3A, the photosensitive drum 11 is a cylindrical member formed with a drum gear 11a at one end portion in the axial direction thereof and a drum flange 11b at the other end portion in the axial direction thereof. The drum gear 11a is a part that receives transmission of the driving force from the drive motor 108 (FIG. 8). An outer diameter of the cylindrical portion of the photosensitive drum 11 (the portion excluding the drum gear 11g and the drum flange 11f) is, for example, 30 mm and within a range of 30.0±0.2 mm considering manufacturing errors. An axial length of the cylindrical portion of the photosensitive drum 11 is, for example, 327 mm.

As illustrated in FIG. 3B, the photosensitive drum 11 includes a conductive support 110, and a photosensitive layer 114 covering a surface of the conductive support 110. The conductive support 110 is, for example, a pipe made of metal such as aluminum or stainless steel.

The photosensitive layer 114 has a multi-layered structure including a charge generation layer 112 and a charge transport layer 113 that are sequentially stacked. An undercoat layer 111 may be formed between the conductive support 110 and the photosensitive layer 114. The undercoat layer 111 is also referred to as a blocking layer.

The undercoat layer 111 is made of, for example, a binder resin in which particles of metal oxide or the like are dispersed. The undercoat layer 111 may be composed of a single layer or a plurality of layers.

Examples of the metal oxide particles used for the undercoat layer 111 include metal oxide particles containing one type of metal element such as titanium oxide, aluminum oxide, silicon oxide, zirconium oxide, zinc oxide, iron oxide, and the like and metal oxide particles containing a plurality of metal elements, such as calcium titanate, strontium titanate, and barium titanate, and the like. These may be used alone, or in combination of two or more types in any ratio.

Among these metal oxide particles, titanium oxide and aluminum oxide may be preferred, and titanium oxide may be particularly preferred. The surface of the titanium oxide particle may be treated with an inorganic substance such as tin oxide, aluminum oxide, antimony oxide, zirconium oxide, or silicon oxide, or an organic substance such as stearic acid, polyol, or silicone.

Any one of these treatments may be applied, or two or more of these treatments may be applied. As the crystal type of the titanium oxide particles, for example, any of rutile, anatase, brookite, and amorphous can be used. The titanium oxide particles may have only one crystal type, or may contain two or more crystal types in any ratio and combination.

The particle size of the metal oxide particles is arbitrary as long as it does not significantly impair the effects of the disclosure, but from the viewpoint of the stability of the solution and the properties of the binder resin of the undercoat layer 111, it may be preferable that the average primary particle size is 10 nm or more and 100 nm or less, preferably 50 nm or less. This average primary particle size can be measured using, for example, a transmission electron microscope (TEM).

It may be preferable that the undercoat layer 111 is formed, for example, by dispersing metal oxide particles in a solution in which a binder resin is dissolved to obtain a coating solution and applying this coating solution on the conductive support 110. Examples of the binder resin used for the undercoat layer 111 include epoxy resin, polyethylene resin, polypropylene resin, acrylic resin, methacrylic resin, polyamide resin, vinyl chloride resin, vinyl acetate resin, phenolic resin, polycarbonate resin, polyurethane resin, polyimide resin, vinylidene chloride resin, polyvinyl acetal resin, vinyl chloride-vinyl acetate copolymer, polyvinyl alcohol resin, polyurethane resin, polyacrylic acid resin, polyacrylamide resin, polyvinylpyrrolidone resin, polyvinylpyridine resin, water-soluble polyester resin, cellulose ester resin such as nitrocellulose, cellulose ether resin, casein, gelatin, polyglutamic acid, starch, starch acetate, amino starch, organic zirconium compound such as zirconium chelate compound and zirconium alkoxide compound, organic titanyl compound such as titanyl chelate compound and titanyl alkoxide compound, silane coupling agent, and the like. These may be used alone, or in combination of two or more types in any ratio. Further, there may be used in a cured form together with a curing agent. In particular, alcohol-soluble copolyamide, modified polyamide, and the like are preferred because they exhibit good dispersibility and coating properties.

The structure of the photosensitive layer 114 may be any structure applicable to known electrophotographic photoreceptors. Specific examples thereof include a single-layer type photoreceptor having a photosensitive layer composed of a single layer (i.e., a single-layer type photosensitive layer) in which a photoconductive material is dissolved or dispersed in binder resin, and a multilayer type photoreceptor including a photosensitive layer composed of a plurality of layers (that is, a multilayer type photosensitive layer) including a charge generation layer containing a charge generating substance and a charge transport layer containing a charge transport substance (charge transport material) that are stacked. In general, it is known that photoconductive material exhibits equivalent performance regardless of the single-layer type or the multi-layer type.

The photosensitive layer 114 of the photosensitive drum 11 according to an embodiment may be in any known form, but may be preferably a multilayer type electrophotographic photoreceptor, taking into consideration the mechanical properties, electrical characteristics, manufacturing stability, and the like of the electrophotographic photoreceptor. In particular, a normal multilayer photoreceptor in which the charge generation layer 112 and the charge transport layer 113 are stacked in this order on the conductive support 110 is more preferable.

When forming the charge transport layer 113 of a multi-layer type photoconductor (functionally separated photoconductor) or when forming the photosensitive layer of a single-layer type photoconductor, binder resin (binder) is used to disperse the compound in order to ensure the film strength. The charge transport layer of the functionally separated photoreceptor can be obtained by applying and drying a coating liquid that is obtained by dissolving or dispersing a charge transport substance and various binder resin in a solvent. The single-layer type photoreceptor can be obtained by applying and drying a coating liquid that is obtained by dissolving or dispersing a charge generating substance, a charge transporting substance, and various binder resins in a solvent.

Examples of the binder resin used in the charge generation layer 112 of the functionally separated photoreceptor include polyvinyl butyral resin, polyvinyl formal resin, polyvinyl acetal resin such as partially acetalized polyvinyl butyral resin in which a portion of butyral is modified with formal, acetal, or the like, polyacrylate resin, polycarbonate resin, polyester resin, modified ether polyester resin, phenoxy resin, polyvinyl chloride resin, polyvinylidene chloride resin, polyvinyl acetate resin, polystyrene resin, acrylic resin, methacrylic resin, polyacrylamide resin, polyamide resin, polyvinylpyridine resin, cellulose resin, polyurethane resin, epoxy resin, silicone resin, polyvinyl alcohol resin, polyvinylpyrrolidone resin, casein, vinyl chloride-vinyl acetate copolymer, hydroxy-modified vinyl chloride-vinyl acetate copolymer, vinyl chloride-vinyl acetate copolymer such as carboxyl-modified vinyl chloride-vinyl acetate copolymer and vinyl chloride-vinyl acetate-maleic anhydride copolymer, styrene-butadiene copolymer, vinylidene chloride-acrylonitrile copolymer, insulating resin such as styrene-alkyd resin, silicone-alkyd resin and phenol-formaldehyde resin, and organic photoconductive polymer such as poly-N-vinyl carbazole, polyvinyl anthracene and polyvinyl perylene, but the binder resin is not limited to these polymers. These may be used alone, or in combination of two or more types in any ratio.

Examples of the binder resin used in the charge transport layer 113 include polyvinyl acetal resin, polyacrylate resin, polycarbonate resin, polyester resin, modified ether polyester resin, phenoxy resin, polyvinyl chloride resin, and polyvinylidene chloride resin, polyvinyl acetate resin, polystyrene resin, acrylic resin, methacrylic resin, polyacrylamide resin, polyamide resin, polyvinylpyridine resin, cellulose resin, polyurethane resin, epoxy resin, silicone resin, polyvinyl alcohol resin, polyvinylpyrrolidone resin, casein, chloride, vinyl chloride-vinyl acetate copolymer, styrene-butadiene copolymer, vinylidene chloride-acrylonitrile copolymer, styrene-alkyd resin, silicone-alkyd resin, phenol-formaldehyde resin, organic photoconductive resin, etc. Examples of the vinyl chloride-vinyl acetate copolymer include vinyl chloride-vinyl acetate copolymer, hydroxy-modified vinyl chloride-vinyl acetate copolymer, carboxyl-modified vinyl chloride-vinyl acetate copolymer, and vinyl chloride-vinyl acetate-maleic anhydride copolymer. Examples of the organic photoconductive resin include poly-N-vinyl carbazole, polyvinyl anthracene, and polyvinyl perylene.

The charge transport layer 113 contains, for example, at least one type of charge transport substance (charge transport material). The type of the charge transport substance is not particularly limited, but examples of the charge transport substance include an aromatic amine derivative, a stilbene derivative, a butadiene derivative, a hydrazone derivative, a carbazole derivative, an aniline derivative, and an enamine derivative. The charge transport substance may be, for example, a compound in which one or more of aromatic amine derivative described above are combined. Further, the charge transport substance may be, for example, a polymer (electron-donating material) including the above-mentioned aromatic amine derivative or the like as a main chain or a side chain. Among these, the charge transport material is preferably an aromatic amine derivative, a stilbene derivative, a hydrazone derivative, an enamine derivative, or a compound in which one or more of them are combined, and more preferably a compound in which an aromatic amine derivative and an enamine derivative are combined.

The charge transport layer 113 further contains an electron transport substance (electron transport material) to reduce printing defects. For example, as an electron transport substance, aromatic quinone is known. In a case where the amount of the electron transport material added in the charge transport layer 113 is large, the charge transport ability may be reduced. Accordingly, the amount of the electron transport material added in the charge transport layer 113 is set to an extent that does not impair the image quality of the toner image.

Each layer constituting the photosensitive drum 11 is formed by applying a coating liquid containing a material constituting the respective layer onto the conductive support 110 and drying the coating liquid using a known coating method. Examples of the solvent (dispersion medium) used to dissolve the binder resin to prepare the coating liquid include saturated aliphatic solvent such as pentane, hexane, octane, and nonane, aromatic solvent such as toluene, xylene, and anisole, halogenated aromatic solvent such as chlorobenzene, dichlorobenzene, and chloronaphthalene, amide solvent such as dimethylformamide and N-methyl-2-pyrrolidone, alcoholic solvent such as methanol, ethanol, isopropanol, n-butanol, and benzyl alcohol, aliphatic polyhydric alcohols such as polyethylene glycol and glycerin, chain, branched or cyclic ketone solvents such as acetone, cyclohexanone, methyl ethyl ketone, and 4-methoxy-4-methyl-2-pentanone, ester solvent such as methyl formate, ethyl acetate, and n-butyl, halogenated hydrocarbon solvent such as methylene chloride, chloroform, and 1,2-dichloroethane, chain or cyclic ether solvent such as diethyl ether, dimethoxyethane, tetrahydrofuran (also called THF), 1,4-dioxane, methyl cellosolve, and ethyl cellosolve, aprotic polar solvent such as acetonitrile, dimethyl sulfoxide, sulfolane, and hexamethyl phosphoric triamide, nitrogen-containing compound such as n-butylamine, isopropanol amine, diethylamine, triethanolamine, ethylenediamine, triethylenediamine, and triethylamine, mineral oil such as ligroin, water, and the like. Those that do not dissolve the undercoat layer are preferred. Note that these may be used alone, or in combination of two or more types in any ratio.

The coating liquid for forming the charge transport layer of the single-layer type photoreceptor or the multilayer type photoreceptor contains a solid content concentration of 5% by weight or more, preferably 10% by weight or more, and 40% by weight or less, and preferably 35% by weight or less. Further, the viscosity of the coating liquid is 10 mPa·s or more, and preferably 50 mPa·s or more, and is 500 mPa·s or less, and preferably 400 mPa·s or less.

In the case of the charge generation layer of the multilayer type photoreceptor, the solid content concentration is 0.1% by weight or more, preferably 1% by weight or more, and is 15% by weight or less, preferably 10% by weight or less. Further, the viscosity of the coating liquid is 0.01 mPa·s or more, preferably 0.1 mPa·s or more and is 20 mPa·s or less, preferably 10 mPa·s or less.

Examples of methods for applying the coating liquid include a dip coating method, a spray coating method, a spinner coating method, a bead coating method, a wire bar coating method, a blade coating method, a roller coating method, an air knife coating method, a curtain coating method, and the like. However, it is also possible to use other known coating methods. One of these methods may be used alone, or two or more of these methods may be used in any combination. The coating liquid is preferably dried to the touch at a room temperature (25° C.), and then dried by heating at a temperature in a range of 30° C. to 200° C. for a period of 1 minute to 2 hours, either without wind or with airflow. The heating temperature may be constant or may be changed during drying.

The thickness of the photosensitive layer of the single-layer type photoreceptor is generally 5 μm or more, preferably 10 μm or more, and is generally 100 μm or less, preferably 50 μm or less. The thickness of the charge transport layer of the normal multilayer photoreceptor is generally 5 μm or more and 50 μm or less. However, it may be preferable that the thickness is 10 μm or more and 45 μm or less from the viewpoint of long life and image stability, and the thickness is 10 μm or more and 30 μm or less from the viewpoint of high resolution.

(Development Roller)

Next, the development roller 13 is described. FIG. 4A is a diagram illustrating a cross-sectional structure of the development roller 13. The development roller 13 includes a conductive core metal 13a (a shaft body), an elastic layer 13b formed on a surface of the core metal 13a, and a surface layer 13c covering the surface of the elastic layer 13b. The core metal 13a may be made of any material having good conductivity, for example, iron, aluminum, stainless steel, or the like.

The elastic layer 13b may be made of a common rubber material such as silicone rubber, urethane, or the like. In the case where polyurethane is used for the elastic layer 13b, it may be preferable that polyurethane is mainly composed of polyether-based polyol. The ether-based polyurethane is a so-called cast-type polyurethane obtained by reacting a polyol mainly composed of polyether-based polyol with polyisocyanate. This is to reduce the compression set. On the other hand, when an ester-based polyurethane is used, the ester-based polyurethane has poor hydrolysis properties and cannot be used stably over a long period of time.

In the case where polyurethane is used for the elastic layer 13b, examples of the isocyanate to be reacted with the polyol may include triphenylmethane triisocyanate, tris (isocyanatophenyl) thiophosphate, bicycloheptane triisocyanate, and the like, and a mixture such as nerate-modified polyisocyanate of hexamethylene diisocyanate, polymeric MDI, etc.

Moreover, a mixture of these trifunctional or more polyisocyanate and a general difunctional isocyanate compound may be used as the polyurethane of the elastic layer 13b. Examples of bifunctional isocyanate compound include 2,4-tolylene diisocyanate (TDI), 4,4-diphenylmethane diisocyanate (MDI), paraphenylene diisocyanate (PPDI), 1,5-naphthalene diisocyanate (NDI), 3,3-dimethyldiphenyl-4,4-diisocyanate (TODI), a modified product or multimer such as prepolymer having these isocyanates at both ends, and the like.

The elastic layer 13b is formed by adding carbon black to the above-described rubber base material and heating and curing the carbon black while maintaining the dispersed state of the carbon. As a result, the carbon black, which exhibits a specific resistance of about 0.1 to 10 Ω·cm, is dispersed in an elastomer (1012 to 1016 Ω·cm), which can be said to be an insulator, to thereby form a medium resistance region having a resistance of 104 to 108 Ω·cm so as to be stable.

The surface layer 13c is formed, for example, by impregnating the surface layer portion of the elastic layer 13b with a surface treatment liquid. The surface treatment liquid is obtained by dissolving at least an isocyanate component in an organic solvent. An example of the organic solvent is methyl acetate, butyl acetate, pentyl acetate, or the like. When using such an organic solvent, for example, isocyanate compounds such as 2,4-tolylene diisocyanate (TDI) and 4,4-diphenylmethane diisocyanate (MDI), multimer or modified body of these, and the like can be used as isocyanate components contained in the surface treatment liquid.

The surface treatment liquid may contain a polyether-based polymer. The polyether-based polymer is preferably soluble in an organic solvent, and preferably has active hydrogen to be chemically bonded by reacting with the isocyanate compound. A suitable example of the polyether-based polymer having the active hydrogen includes polymer having hydroxyl group or allyl group, such as polyol, glycol, or the like to be used for isocyanate-terminated prepolymer.

In addition, the surface treatment liquid may contain a polymer selected from acrylic fluorine-based polymer and acrylic silicone-based polymer. The acrylic fluorine-based polymer and the acrylic silicone-based polymer are soluble in a predetermined solvent and can be chemically bonded to the isocyanate compound by reacting with the isocyanate compound. The acrylic fluorine-based polymer is, for example, a solvent-soluble fluorine-based polymer having a hydroxyl group, an alkyl group, or a carboxyl group. Examples thereof include a block copolymer of an acrylic acid ester and a fluorinated alkyl acrylate, and a derivative thereof. In addition, the acrylic silicone-based polymer is a solvent-soluble silicone-based polymer. Examples thereof include block copolymer of acrylic acid ester and acrylic acid siloxane ester, and a derivative thereof.

Further, carbon black such as acetylene black or the like may be added to the surface treatment liquid as a conductivity imparting agent.

It may be preferable that the polyether-based polymer, acrylic fluorine-based polymer and acrylic silicone-based polymer in the surface treatment liquid are such that the total amount of the polyether-based polymer, acrylic fluorine-based polymer and acrylic silicone-based polymer is 10 to 70% by mass with respect to the isocyanate component. If it is less than 10% by mass, the effect of retaining the carbon black or the like in the surface treatment liquid would be reduced. On the other hand, if it is more than 70% by mass, there may be a problem that the electrical resistance value increases or the amount of the isocyanate component becomes relatively too small to form an effective surface treatment layer.

By immersing the elastic layer 13b in the surface treatment liquid described above to apply the surface treatment liquid to the elastic layer 13b and drying and curing the elastic layer 13b, the surface layer portion of the elastic layer 13b is impregnated with the surface treatment liquid and thus forms the surface layer 13c. An outer diameter of the development roller 13, for example, 16.0 mm.

The resistance value of the development roller 13 is measured by a method illustrated in FIGS. 5A and 5B. As a measuring device 25, a high resistance meter (model number: 4339B) manufactured by Hewlett-Packard is used. As illustrated in FIG. 5A, a load of 300 g (W=300 g) is applied to a shaft portion 13e at each end of the core metal 13a of the development roller 13, and the metal roller 26 made of stainless steel with a diameter of 30 mm is brought into contact with the development roller 13.

The metal roller 26 is rotated at a speed of 50 rpm with a potential difference of −100 volts (V) being applied to a shaft portion 27 of the metal roller 26 with respect to the shaft portion 13e of the development roller 13. Then, the resistance of the development roller 13 is measured at 100 points per revolution of the development roller 13, and the average value thereof is taken as the resistance value of the development roller 13. It may be preferable that the resistance value of the development roller 13 is $1 \times 10^4$ to $1 \times 10^7 \Omega$. Here, the development roller 13 having the resistance value of $1 \times 10^5 \Omega$ is used.

(Supply Roller)

Next, the supply roller 14 is described. FIG. 4B is a diagram illustrating a cross-sectional view of the supply roller 14. The supply roller 14 includes a conductive core metal (shaft body) 14a and a sponge-like foamed elastic layer 14b formed on a surface of the core metal 14a. The core metal 14a may be made of any material having good conductivity, for example, iron, aluminum, stainless steel, or the like.

A rubber composition to form the foamed elastic layer 14b contains rubber, a foaming agent, a conductivity-imparting agent, and, if necessary, additives. It may be preferable that the rubber is silicone rubber or silicone-modified rubber, which is excellent in heat resistance and chargeability. The foaming agent may be any foaming agent used for foamed rubber. Examples of inorganic foaming agent include sodium bicarbonate, ammonium carbonate, and the like. Examples of organic foaming agent include organic azo compound, such as diazoamino derivative, azonitrile derivative, azodicarboxylic acid derivative, and the like. In a case of forming continuous cells in the foamed elastic layer 14b, an inorganic foaming agent is used. In a case of forming close cells in the foamed elastic layer 14b, an organic foaming agent is used. The additives are, for example, fillers, colorants, release agents, and the like.

The outer diameter of the supply roller 14 is, for example, 15.5 mm. It may be preferable that the average cell diameter of the foamed elastic layer 14b of the supply roller 14 is 200 to 500 μm. It may be preferable that the hardness of the foamed elastic layer is about 50 to 65 degrees in terms of Asker F hardness. Here, the hardness of the foamed elastic layer is 58 degrees.

It may be preferable that the resistance value of the supply roller 14 is 3.5 to 7.5 log Ω. Here, the supply roller 14 having the resistance value of 5.5 log Ω is used. The method of measuring the resistance value of the supply roller 14 is the same as the method of measuring the resistance value of the development roller 13, and is as described with reference to FIGS. 5A and 5B.

(Development Blade)

The development blade 15 illustrated in FIG. 2 is a plate-shaped elastic body made of metal. More specifically, the development blade 15 is made of stainless steel, and has a plate thickness of, for example, 0.08 mm. The development blade 15 is formed in an elongated shape extending in the X direction.

One end (fixed end) in the width direction of the development blade 15 is fixed to a blade holder 23 provided to the frame 17. The other end (free end) in the width direction of the development blade 15 is bent, and the radius of curvature of the bent portion of the development blade 15 is approximately 0.18 mm. The bent portion of the development blade 15 is in contact with the surface of the photosensitive drum 11. The pressure (linear pressure) between the development blade 15 and the development roller 13 is about 40 gf/cm.

In view of setting conditions of the development blade 15, the surface roughness, resistance value, etc. of the development roller 13 are set in order to set the toner layer thickness and toner charge amount on the development roller 13 to desired values. It may be preferable that the surface roughness of the development roller 13 is such that the ten-point average roughness Rz (JIS B0601-1994) in the circumferential direction thereof is 2 to 10 μm.

(Charging Roller)

FIG. 6A is a diagram illustrating a cross-sectional structure of the charging roller 12. As illustrated in FIG. 6A, the charging roller 12 includes a core metal (shaft body) 12a, an elastic layer 12b formed on a surface of the core metal 12a, and a surface layer 12c covering a surface of the elastic layer 12b.

The core metal 12a is formed of a conductive material, for example, metal such as electroless nickel-plated free-cutting steel (SUM) or stainless steel (SUS). The elastic layer 12b is formed of rubber, thermoplastic elastomer, resin, or the like so as to form a nip between the elastic layer 12b and the photosensitive drum 11 in which proper discharge occurs. The elastic layer 12b may be a single layer or may have a multilayer structure of two or more layers.

The elastic layer 12b is made of, for example, a rubber composition whose main component is one of or a mixture of two of epichlorohydrin rubber (CO, ECO, GECO), ethylene propylene rubber (EPM, EPDM), acrylonitrile-butadiene rubber (NBR), hydrogenated acrylonitrile-butadiene rubber (H-NBR), styrene-butadiene rubber (SBR), butadiene rubber (BR), isoprene rubber (IR), chloroprene rubber (CR), urethane rubber, silicone rubber, etc.

In particular, it may be preferable to use rubber containing epichlorohydrin rubber (ECO) as a main component or rubber containing a mixture of epichlorohydrin rubber (ECO) and acrylonitrile-butadiene rubber (NBR) as a main component. In an embodiment, a rubber that contains epichlorohydrin rubber (ECO) as a main component thereof is used.

If the electrical resistance of the elastic layer 12b is too high, the surface of the photosensitive drum 11 would be unevenly charged or overcharged, resulting in poor printing. Conversely, if the electrical resistance of the elastic layer 12b is too low, current leakage due to scratches on the surface of the photosensitive drum 11 would cause poor printing. Therefore, the electrical resistance of the elastic layer 12b may need to be set in an appropriate range. In order to set the electric resistance of the elastic layer 12b in such an appropriate range, the elastic layer 12b is added with an ion-conductive material, an ion-conducting agent, a carbon black, a metallic oxide, or the like to provide a predetermined conductivity.

The elastic layer 12b may have electronic conductivity or ionic conductivity. Partial resistance unevenness of the elastic layer 12b is likely to lead to charging unevenness of the photosensitive drum 11. Therefore, an elastic layer having ionic conductivity is often used from the viewpoint of suppressing such resistance unevenness. However, an elastic layer having electronic conductivity may be used.

It may be preferable that the volume resistivity of the elastic layer 12b is 106 to 109Ω. In a case where the charging roller 12 has ionic conductivity, the volume resistance value varies depending on the temperature and humidity. Here, the volume resistance value is measured under an environment of 20° C. and relative humidity of 50%.

The hardness of the elastic layer 12b is adjusted such that a minute gap is formed between the surface of the charging roller 12 and the surface of the photosensitive drum 11 so as to generate proper discharge based on Paschen's law. For measuring the hardness of the elastic layer 12b, peak measurement is performed using a micro rubber hardness tester "MD-1capa" (Type_A) manufactured by Kobunshi Keiki Co., Ltd. When measured by this method, it may be preferable that the hardness of the elastic layer 12b is in the range of 35 degrees to 80 degrees. In the case where the hardness of the elastic layer 12b is within the range of 35 degrees to 80 degrees, eccentricities or variations in shapes of the charging roller 12 and the photosensitive drum 11 can be absorbed. However, the hardness range is not limited to the above-described range as long as an appropriate nip is formed between the charging roller 12 and the photosensitive drum 11.

The surface (that is, the outer circumferential surface) of the elastic layer 12b is given a predetermined surface roughness by cutting, polishing, molding, or the like. It may be preferable that the ten-point average roughness Rz of the charging roller 12 is, for example, approximately 1 to 30 μm according to Paschen's law, although depending on the applied voltage and the usage environment. The surface of the elastic layer 12b may be subjected to surface treatment, coating, ultraviolet irradiation, or electron beam irradiation. These treatments can prevent contamination of the photosensitive drum 11 or adjust the resistance of the elastic layer 12b. In addition, with these treatments, the toner and/or external additive thereof adhered to the photosensitive drum 11 are less likely to be adhered to the surface of the charging roller 12.

The surface layer 12c is formed by coating the surface of the elastic layer 12b with a solution obtained by mixing urethane-based polymer and porous particles in ethyl acetate (solvent) (see Examples 1-1 to 1-5 described below). The application is performed by dipping, spraying, coater, or the like. Note that the urethane-based polymer is a homopolymer or copolymer having a urethane bond formed by condensation of an isocyanate group and an alcohol group.

For forming the surface layer 12c, toluene diisocyanate (TDI), methylene diisocyanate (MDI), xylylene diisocyanate (XDI), naphthalene diisocyanate (NDI), hexamethylene diisocyanate (HDI), isophorone diisocyanate (IPDI), polyester polyol, polycarbonate polyol, silicone diol, acrylic fluorine-based polymer, acrylic silicone-based polymer, fluorine-based polymer, and a multimer or modified product thereof, and the like can be used, for example. In addition, a conductive agent such as carbon black, an ionic conductive agent, an electronic conductive agent, etc. can be added as necessary.

As the porous particles contained in the surface layer 12c, one of or a combination of two or more of urethane resin, acrylic resin, nylon resin, fluorine resin, polyamide resin, polycarbonate resin, polyester resin, isocyanate resin, etc. can be used for example.

Here, as an example, the core metal 12a of the charging roller 12 has an outer diameter of 8 mm, and the elastic layer 12b has an outer diameter of 12 mm.

(Cleaning Member)

The cleaning member 16 illustrated in FIG. 2 is formed of a plate-like elastic body. The cleaning member 16 is supported by a plate-shaped jig 24 provided to the frame 17.

The material of the cleaning member 16 is not particularly limited, but it may be preferable to use an elastic composition so as not to damage the surface of the photosensitive drum 11 when the cleaning member 16 is in sliding-contact with the surface of the photosensitive drum 11 to scrape off the residual toner on the surface of the photosensitive drum 11. Examples thereof include a composition in which an additive is blended to polyurethane, silicone resin, fluororesin, fluororubber, or the like. In particular, a polyurethane composition may be preferable which is excellent in mechanical strength and elastic pressability.

The polyurethane composition described above can be obtained using polyisocyanate, polyol, a curing agent, and a catalyst.

The polyisocyanate is not limited to, but example of the polyisocyanate include diisocyanate such as 4,4'-diphenylmethane diisocyanate (MDI), 2,4-tolylene diisocyanate (2,4-TDI), and 2,6-tolylene diisocyanate (2,6-TDI), 3,3'-tolylene-4,4'-diisocyanate, 3,3'-dimethyldiphenylmethane-4,4'-diisocyanate, 2,4-tolylene diisocyanate uretidinedione (2,4-TDI dimer), 1,5-naphthylene diisocyanate, metaphenylene diisocyanate, hexamethylene diisocyanate, isophorone diisocyanate, 4,4'-dicyclohexylmethane diisocyanate (water-added MDI), carbodiimide-modified MDI, orthotoluidine diisocyanate, xylene diisocyanate, paraphenylene diisocyanate and lysine diisocyanate methyl ester, or the like, triisocyanate triphenylmethane-4,4',4"-triisocyanate, polymeric MDI, and the like. These may be used alone or in combination of two or more. In particular, from the viewpoint of wear resistance, MDI is preferred.

The polyol used together with the polyisocyanate is not particularly limited, but examples of the polyol include polyester polyol such as polyethylene adipate (PEA), polybutylene adipate (PBA), polyhexylene adipate, and the like, and polyether polyol such as polycaprolactone, polyoxytetramethylene glycol, polyoxypropylene glycol, and the like. These may be used alone or in combination of two or more. In particular, PBA is preferred because it has excellent wear resistance.

The curing agent used with the polyisocyanate and polyol is not particularly limited, but examples of the curing agent include polyol having a molecular weight of 300 or less, such as 1,4-butanediol, ethylene glycol, diethylene glycol, propylene glycol, dipropylene glycol, hexanediol, 1,4-cyclohexanediol, 1,4-cyclohexanedimethanol, xylene glycol, triethylene glycol, trimethylolpropane, glycerin, pentaerythritol, sorbitol, and 1,2,6-hexanetriol. These may be used alone or in combination of two or more.

The linear pressure of the cleaning member 16 against the photosensitive drum 11 is preferably 15 gf/cm or more and 30 gf/cm or less. Here, the linear pressure is set to 20 gf/cm. Further, the cleaning angle is set to be 10 degrees or more and 15 degrees or less.

(Transfer Roller)

FIG. 6B is a cross-sectional view illustrating a cross-sectional structure of the transfer roller 31. The transfer roller 31 includes a conductive core metal (shaft body) 31a and an elastic layer 31b formed on a surface of the core metal 31a. The core metal 31a may be made of any material having conductivity, for example, iron, aluminum, stainless steel, or the like. The elastic layer 31b is, for example, a foamed rubber layer such as acrylonitrile butadiene rubber (NBR) or the like.

(Transfer Belt)

The transfer belt 32 illustrated in FIG. 1 is an endless belt made of a highly resistive semi-conductive plastic film. The transfer belt 32 is made of, for example, resin such as polyamide, polyimide, polyether ether ketone, or a mixture of these materials. Further, the transfer belt 32 may have a base layer and a surface layer.

Figure 7:
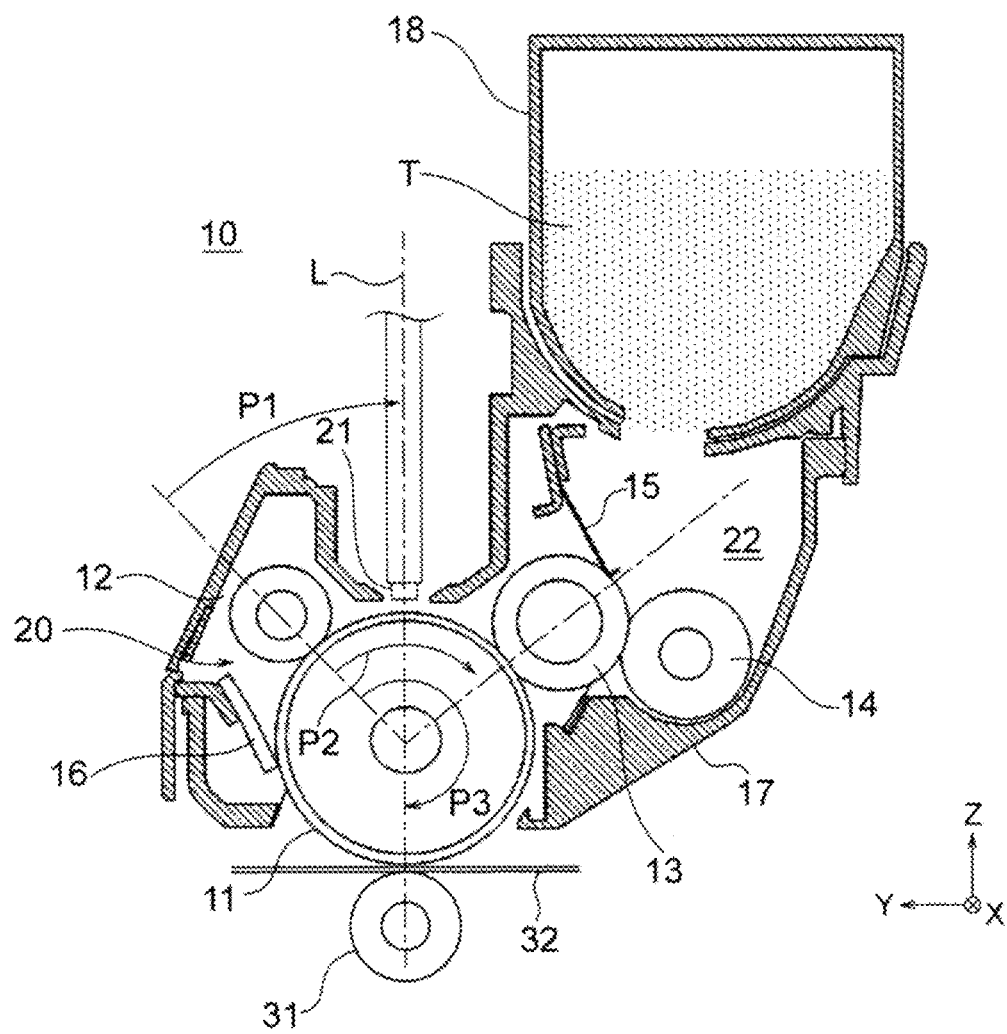
FIG. 7 is a schematic diagram illustrating a charging position, an exposure position, a development position, and a transfer position on the photosensitive drum according to an embodiment.

FIG. 7 is a schematic diagram for explaining a charging position, an exposure position, a development position, and a transfer position of the photosensitive drum 11 in the Image formation unit 10. The charging position is a position where the photosensitive drum 11 contacts the charging roller 12. In other words, the charging position is a position where the charging voltage $V_{CH}$ (voltage of −1000 volts), which will be described later, is applied to the photosensitive drum 11.

The exposure position is a position where the photosensitive drum 11 faces the exposure head 21. In other words, the exposure position is a position where the photosensitive drum 11 is exposed at an exposure amount Q (of 0.13 to 0.34 µJ/cm2), which will be described later.

The developing position is a position where the photosensitive drum 11 contacts the development roller 13. In other words, the development position is a position where a probe of an electrometer 80, which will be described later, is to be arranged.

The transfer position is a position where the photosensitive drum 11 contacts the transfer roller 31. In other words, the transfer position is a position where the transfer voltage $V_{TR}$ (the voltage of +2850 volts), which will be described later, is applied to the photosensitive drum 11.

A rotational direction of the photosensitive drum 11 (the clockwise direction in the figure) is referred to as a first circumferential direction. Assuming that the charging position is a reference position, the exposure position is separated from the reference position by an angle P1 in the first circumferential direction. The development position is separated from the reference position by an angle P2 in the first circumferential direction. The transfer position is separated from the reference position by an angle P3 in the first circumferential direction.

Here, the angle P1 is 44.0 degrees, the angle P2 is 97.6 degrees, and the angle P3 is 224.0 degrees. The values of these angles P1, P2, and P3 are merely examples, and can be changed as appropriate.

(Control System of Image Formation Apparatus)

Next, a control system of the image formation apparatus 1 is described. FIG. 8 is a block diagram illustrating a view of a control system (control-related configuration) of the image formation apparatus 1. The image formation apparatus 1 includes a controller 100, a reception memory 121, an image data editing memory 122, an operation section 123, sensors 124, and a power supply circuit 130.

The controller 100 includes a print controller (main controller) 101, an interface (I/F) controller 102, a head controller 103, a fixation controller 104, a fixation drive controller 105, a conveyance controller 106, and a drive controller 107.

The print controller 101 is equipped with a microprocessor, a ROM (Read Only Memory), a RAM (Random Access Memory), input/output ports, a timer, and the like. The print controller 101 controls an overall operation of the image formation apparatus 1 by executing predetermined programs. Specifically, the print controller 101 receives print data and control commands from an external device via the interface controller 102, and controls the head controller 103, the fixation controller 104, the fixation drive controller 105, and the conveyance controller 106, the drive controller 107, and the power supply circuit 130 comprehensively to execute a printing operation.

The interface controller 102 receives the print data and the control command from the external device such as a personal computer or the like, and transmits information about the state of the image formation apparatus 1 to the external device.

The reception memory 121 temporarily records the print data inputted from the external device via the interface controller 102.

The image data editing memory 122 receives the print data stored in the reception memory 121 and records image data obtained by editing the print data.

The operation section 123 includes a display or a display device that displays information about the state of the image formation apparatus 1 and an input unit that receives an input or an operation from the user. The display is configured by, for example, an LED lamp, and the input section is configured by, for example, buttons or a touch panel.

The sensors 124 includes various sensors that monitor the operating state of the image formation apparatus 1. Specifically, the sensors 124 includes a position detection sensor that detects a position of the medium M in the conveyance path, a temperature/humidity sensor, a print density sensor, a toner remaining amount sensor, and the like.

The power supply circuit 130 includes the charging roller power supply 131 that applies the charging voltage to the charging roller 12, the development roller power supply 132 that applies the development voltage to the development roller 13, the supply roller power supply 133 that applies the supply voltage to the supply roller 14, the development blade power supply 134 that applies the blade voltage to the development blade 15, and the transfer roller power supply 135 that applies the transfer voltage to the transfer roller 31.

The head controller 103 controls light emission of each LED of the exposure head 21 based on the image data recorded in the image data editing memory 122.

The fixation controller 104 includes a temperature control circuit, and supplies electric current to the heater in the fixation roller 51 based on an output signal of a temperature sensor such as a thermistor provided in the fixation device 50.

The fixation drive controller 105 controls rotation of the fixation motor 53 that is configured to drive the fixation roller 51 to rotate. Note that the discharge roller pairs 61 are also driven to rotate by the fixation motor 53.

The conveyance controller 106 controls rotation of the conveyance motor 45 that is configured to drive the hopping roller 42, the regist roller pair 43 and the conveyance roller pair 44. The rotation of the conveyance motor 45 is transmitted to the hopping roller 42, the regist rollers 43, and the conveyance rollers 44 via an electromagnetic clutch (not illustrated) or the like.

The drive controller 107 controls rotation of the drive motor 108 that is configured to drive the photosensitive drum 11 to rotate. The rotation of the photosensitive drum 11 is also transmitted via a gear train (not illustrated) to the development roller 13, the supply roller 14, and the drive roller 33.

(Printing Operation of Image Formation Apparatus)

Next, a printing operation of the image formation apparatus 1 is described with reference to FIGS. 1 and 8. Upon receiving the control command and the print data from the external device via the interface controller 102, the print controller 101 starts a printing operation.

The print controller 101 temporarily records the print data received from the external device in the reception memory 121, edits and processes the recorded print data to generate the image data, and records the image data in the image data editing memory 122.

The fixation drive controller 105 drives the fixation motor 53, so as to start to rotate the fixation roller 51 and pressure roller 52. Further, the fixation controller 104 energizes the heater in the fixation roller 51, so as to heat the fixation roller 51 to a predetermined fixing temperature.

The conveyance controller 106 drives the conveyance motor 45, to cause the hopping roller 42 to feed the medium M from the media tray 41 to the conveyance path. Also, the pair of regist rollers 43 and the pair of conveyance rollers 44 each rotate to convey the medium M to the transfer unit 30.

The charging voltage, the development voltage, the supply voltage, and the blade voltage are applied from the power supplies 131 to 134 of the power supply circuit 130 to the charging roller 12, the development roller 13, the supply roller 14, and the development blade 15 of each image formation unit 10, respectively.

The drive controller 107 drives the drive motor 108 so as to rotate the photosensitive drum 11 in each of the image formation units 10. Along with the rotation of the photosensitive drum 11, the charging roller 12, the development roller 13 and the supply roller 14 also rotate. The charging roller 12 uniformly charges the surface of the photosensitive drum 11.

The head controller 103 drives the exposure head 21 to irradiate the surface of the photosensitive drum 11 with light. As a result, an electrostatic latent image is formed on the surface of the photosensitive drum 11.

The electrostatic latent image formed on the surface of the photosensitive drum 11 is developed by the toner attached to the development roller 13, and thus a toner image is formed on the surface of the photosensitive drum 11. Further, the transfer voltage is applied to the transfer roller 31 from the transfer roller power supply 135.

By this transfer voltage, the toner image formed on the surface of the photosensitive drum 11 is transferred onto the medium M passing between the photosensitive drum 11 and the transfer roller 31. The toner that has not been transferred to the medium M is removed off the surface of the photosensitive drum 11 by the cleaning member 16. The toner images are transferred from the photosensitive drums 11 of the image formation units 10 onto the medium M, and thus are superimposed on each other on the medium M.

In the fixation device 5, heat and pressure are applied to the medium M passing through the fixation nip between the fixation roller 51 and the pressure roller 52, and thus the toner images on the medium are fixed to the medium M The medium having the toner images fixed thereon is conveyed to the medium discharge part 6.

In the medium discharge part 6, the pair of the discharge rollers 61 discharges the medium M from the discharge port. The discharged medium M is stacked on the stacker 63. This completes the formation of the image on the medium M.

(Operation of Image Formation Unit)

An operation of the image formation unit 10 in the above-described printing operation is described below. The photosensitive drum 11, the charging roller 12, the development roller 13, and the supply roller 14 of each image formation unit 10 rotate in the directions indicated by arrows in FIG. 2, respectively.

A case will be described below in which a medium M, which is A4 size plain paper, is printed with the longitudinal feeding. The printing speed is 151 mm/s in the circumferential speed. The outer diameter of the development roller 13 is 16.0 mm, and the circumferential speed of the development roller 13 is 0.3 m/s, and the outer diameter of the supply roller 14 is 15.5 mm, and the circumferential speed of the supply roller 14 is 0.2 m/s. The axial length of the photosensitive drum 11 is 327 mm, and the outer diameter of the photosensitive drum 11 is 30.0±0.2 mm, and the circumferential speed of the photosensitive drum 11 is 0.22 m/s.

The supply roller 14 rotates with carrying toner on the outer circumferential surface and in the cells of the foamed elastic layer 14b of the supply roller 14, so as to convey the toner to the contact portion between the supply roller 14 and the development roller 13. A DC voltage of −330 volts is applied to the supply roller 14 from the supply roller power supply 133, and a DC voltage of −200 volts is applied to the development roller 13 from the development roller power supply 132. Due to the potential difference between the development roller 13 and the supply roller 14, the negatively charged toner is supplied to the development roller 13.

A DC voltage of −330 volts is applied to the development blade 15 from the development blade power supply 134. By this development blade 15, the toner on the surface of the development roller 13 is regulated into a thin layer.

A DC voltage of −1000 volts is applied to the charging roller 12 from the charging roller power supply 131. By this charging roller 12, the surface of the photosensitive drum 11 is uniformly charged to about −420±30 volts.

The exposure head 21 exposes light onto the uniformly-charged surface of the photosensitive drum 11, so as to form an electrostatic latent image on the photosensitive drum 11. The electrostatic latent image formed on the surface of the photosensitive drum 11 is developed with toner carried by the development roller 13, and thus a toner image is formed on the surface of the photosensitive drum 11.

When printing a solid image having a print image density of 100%, the surface potential of the photosensitive drum 11 is attenuated to about −50 to −100 volts due to the exposure of all LEDs of the exposure head 21, from −420 volts before the exposure.

The toner on the development roller 13 that has not been supplied to the photosensitive drum 11 is removed off by the supply roller 14 at a portion of the development roller 13 opposed to the supply roller 14.

The toner image on the surface of the photosensitive drum 11 is transferred onto the medium M by the transfer roller 31 (FIG. 1) to which the predetermined transfer voltage is applied.

To the contrary, the toner remaining on the surface of the photosensitive drum 11 without being transferred to the medium M and the external additives released from the toner base particles and attached to the surface of the photosensitive drum 11 are removed off by the cleaning member 16.

After the toner and the external additives are removed off the surface of the photosensitive drum 11 by the cleaning member 16, a static eliminating light unit (not illustrated) irradiates the surface of the photosensitive drum 11 with a static eliminating light to eliminate static electricity. The surface of the photosensitive drum 11 from which the static electricity has been removed is charged again by the charging roller 12.

(Strong Transfer History)

Next, a strong transfer history, which is one of printing defects, is described. When a high resistance medium is used as the medium M, applying the same transfer voltage as for plain paper may not provide the current necessary to transfer the toner image, resulting in insufficient transfer and transfer blurring. Therefore, when using the high resistance medium, the transfer voltage is generally set higher than when using the plain paper.

The high resistance medium is a medium with a high volume resistivity, and examples of the high resistance medium include coated paper (water-resistant paper, etc.) made of paper coated with a resin, a film medium made of polyester, and the like. To the contrary, the plain paper is a medium with a relatively low volume resistivity (a low resistance medium).

Figure 9:
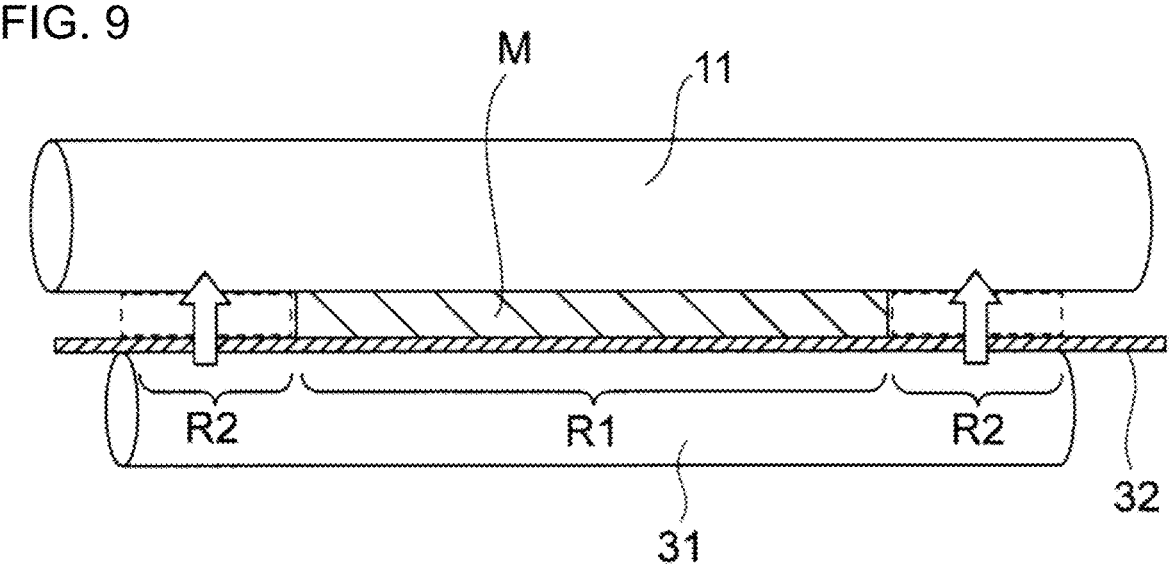
FIG. 9 is a schematic diagram illustrating the photosensitive drum, a transfer roller, and a medium according to an embodiment.

FIG. 9 is a schematic diagram illustrating a state in which the medium M is passing between the photosensitive drum 11 and the transfer roller 31. A region of the photosensitive drum 11 where the photosensitive drum 11 contacts the medium M is referred to as a medium region R1 (a medium-contact region R1, or a first region R1). To the contrary, in regions on both outsides of the medium M in the width direction, the photosensitive drum 11 and the transfer roller 31 face each other with the transfer belt 32 in between and without the medium M in between. These regions are referred to as out-of-medium regions R2 (no-medium regions R2, or second regions R2) or may be correctively referred to as an out-of-medium region R2 (no-medium region R2, or second region R2).

Note that although a case is described here in which the transfer belt 32 is used, a configuration may be used in which the photosensitive drum 11 and the transfer roller 31 are in contact with each other without using the transfer belt 32, such as in an image formation apparatus that forms a monochrome image (a monochrome printer, etc.).

When the high resistance medium is used as the medium M as described above, a high transfer voltage is applied to the transfer roller 31, and thus in the out-of-medium region R2 where the photosensitive drum 11 and the transfer roller 31 face each other, the current flows from the transfer roller 31 to the photosensitive drum 11. At an area of the surface of the photosensitive drum 11 into which the current flows, the photosensitive drum 11 is charged to a polarity (positive polarity) opposite to the intended charge potential (negative polarity).

When printing is repeated, the positive potential is accumulated on the area of the surface of the photosensitive drum 11, resulting in charging failure. The accumulation of the positive potential does not disappear even after several hours of standing, and is therefore called a strong transfer history. In such a state where the strong transfer history exists, if a halftone image is printed, the density in the printed halftone image becomes higher in the area where the positive potential is accumulated, resulting in a printing defect.

FIGS. 10A to 10F are schematic diagrams illustrating charge states in the conductive support 110, the undercoat layer 111, the charge generation layer 112, and the charge transport layer 113 of the photosensitive drum 11. In FIGS. 10A to 10F, the transfer roller 31 and the transfer belt 32 are not illustrated, but it is assumed that the transfer roller 31 and the transfer belt 32 are located above the photosensitive drum 11 in the figures.

Figures 10A, 10B, 10C, 10D, 10E:
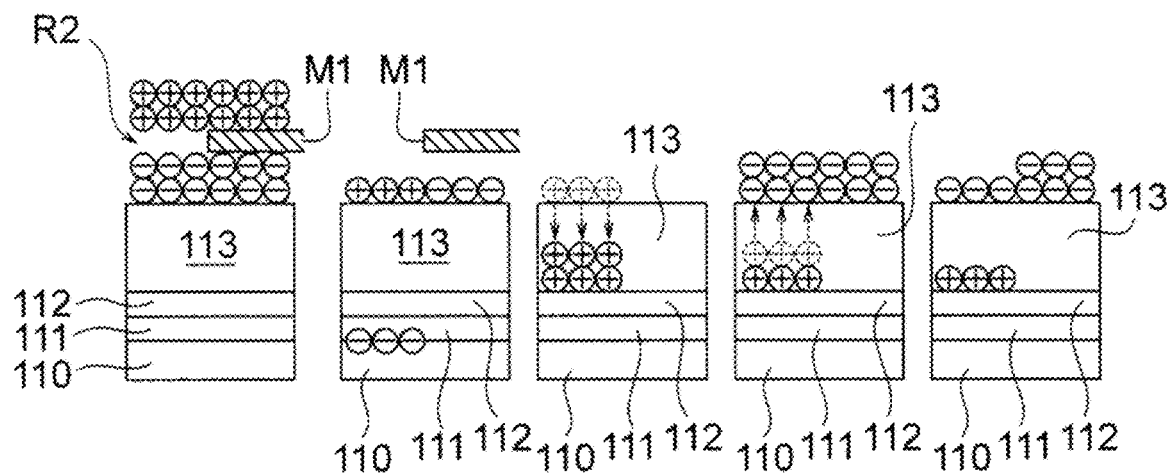
FIGS. 10A to 10E are schematic diagrams illustrating movements of charges on a surface of the photosensitive drum according to an embodiment.

When the toner image is transferred to the high resistance medium M1 as illustrated in FIGS. 10A and 10B, in the out-of-medium region R2, a strong current flows from the transfer roller 31 to the photosensitive drum 11 and thus positive charges accumulates in the charge transport layer 113.

When the transfer operation is repeated, the positive charges in the charge transport layer 113 move to the charge generation layer 112, and are thus accumulated in the charge generation layer 112, as illustrated in FIG. 10C.

When the positive charges are accumulated in the charge generation layer 112 in this manner, the positive charges that have been moved from the charge transport layer 113 to the charge generating layer 112 cancels out part of the negative charges applied from the charging roller 12 during the next printing, as illustrated in FIG. 10D. As a result, as illustrated in FIG. 10E, a step is generated in the charge distribution on the surface of the charge transport layer 113.

In this state, when a halftone image is printed on the medium M having a wide width (dimension in the direction perpendicular to the conveyance direction F), the step in the charge distribution on the surface of the photosensitive drum 11 become a step in an amount of toner adhered to the surface of the photosensitive drum 11, so as to become a step in a density level (a density step) in a print image on the medium M. That is, the density step occurs in the print image.

Figure 11A:
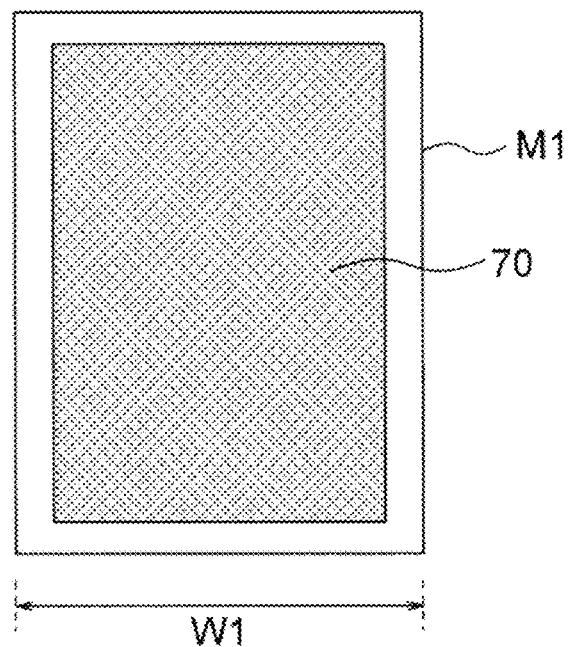
FIGS. 11A to 11C are schematic diagrams for explaining an example of a strong transfer history occurring in a print image.
Figure 11B:
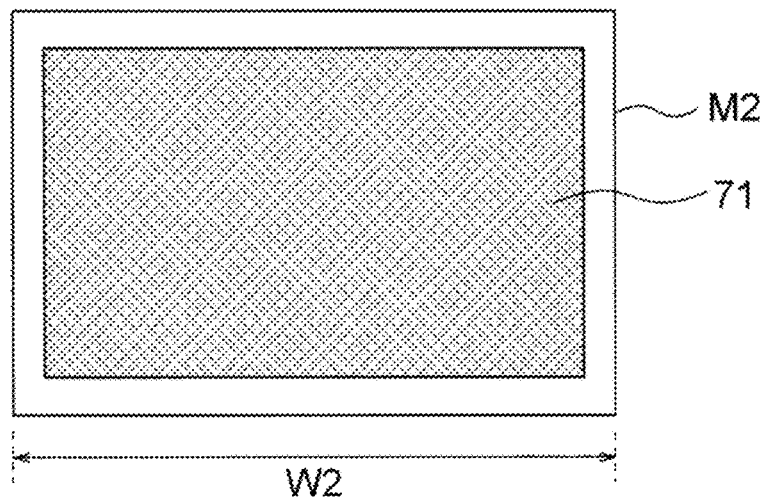
Figure 11C:
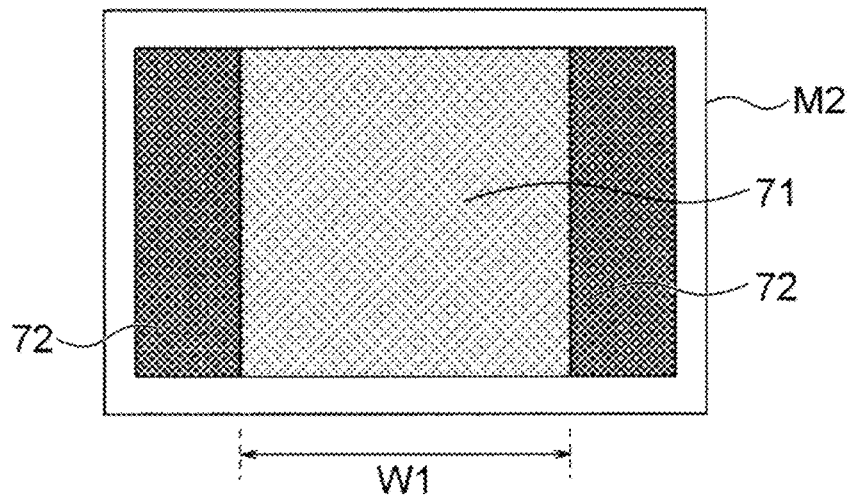

Therefore, for example, when an image(s) 70 is printed continuously on a plurality of high resistance media M1 having a width W1 (dimension in a direction perpendicular to the conveyance direction F) as illustrated in FIG. 11A and then a halftone image 71 is printed on a medium M2 having a width W2 (>W1) as illustrated in FIG. 11B, a high density portion 72 occurs in a region of the printed halftone image 71 outside a region corresponding to the width W1 of the high resistance media M1 as illustrated in FIG. 11C.

Therefore, the image formation unit 10 and the drum unit 20 according to an embodiment are equipped with the photosensitive drum 11 that has a characteristic that the surface of the photosensitive drum 11 does not easily accumulate the positive charges thereon even when the high transfer voltage is applied.

The property that the surface of the photosensitive drum 11 does not easily accumulate the positive charges can be achieved, for example, by adding an electron transport substance to the charge transport layer 113. Such an addition of the electron transport material to the charge transport layer 113 is a negative factor in improving the inherent ability (charge transport ability) of the charge transport layer 113, but is effective in canceling out the positive charge generated by the high transfer voltage mentioned above.

(Measurement of Surface Potential of Photosensitive Drum)

Figure 12A:
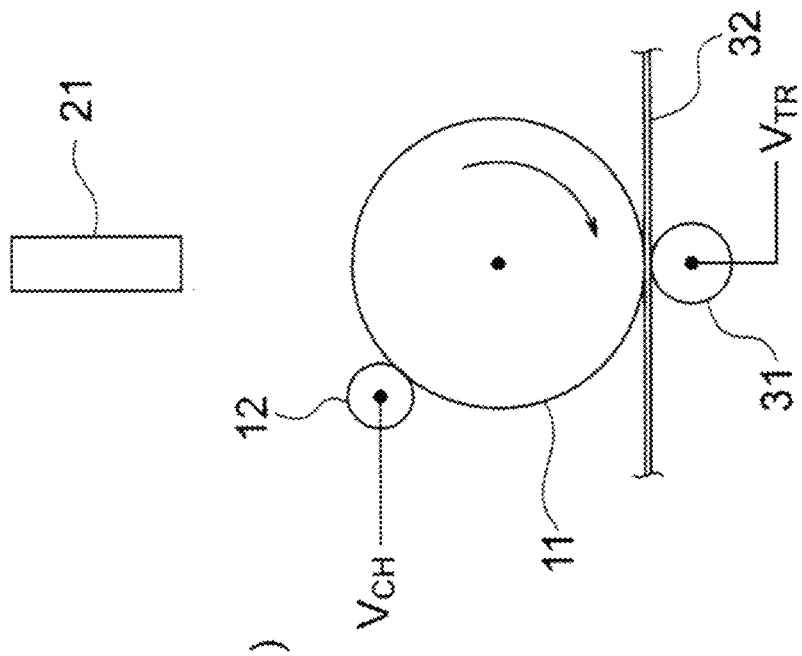
FIGS. 12A and 12B are schematic diagrams illustrating a method for measuring a light attenuation change rate.
Figure 12B:
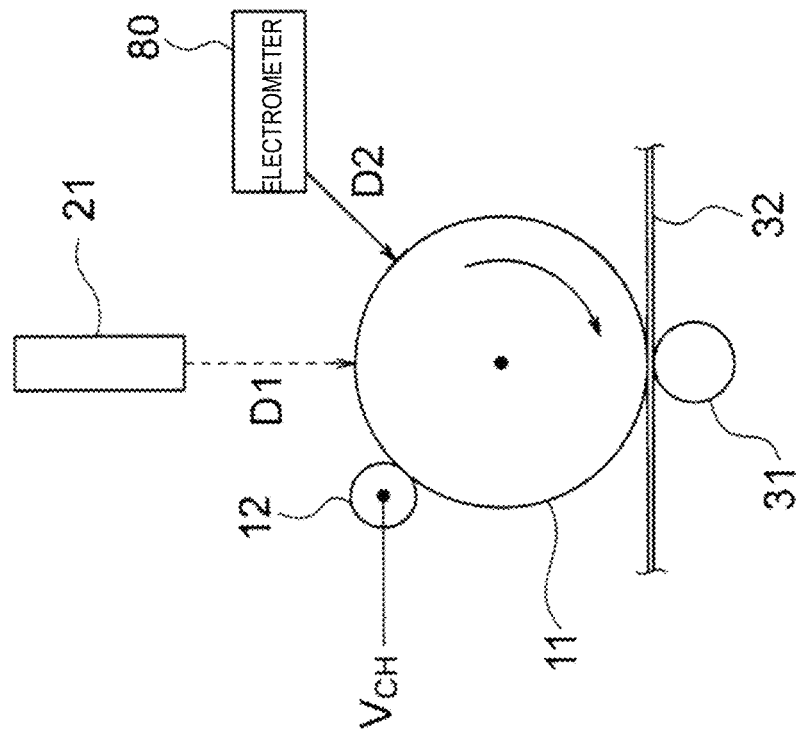

FIGS. 12A and 12B are schematic diagrams for explaining a method for measuring the surface potential of the photosensitive drum 11. FIG. 12A illustrates the photosensitive drum 11, the charging roller 12, the exposure head 21, and the transfer roller 31 among the components of the image formation unit 10.

For measuring the surface potential of the photosensitive drum 11, an electrometer 80 is set into the image formation unit 10. As the electrometer 80, a surface electrometer "Model 344" manufactured by Trek Corporation is used. A probe of the electrometer 80 is placed at a position where a distance D2 from the surface of the photosensitive drum 11 is 5 mm. Further, a circumferential position of the probe of the electrometer 80 around the photosensitive drum 11 (the circumferential position about the rotation axis of the photosensitive drum 11) is set to be the same as the circumferential position of the development roller 13 around the photosensitive drum 11.

The surface potential of the photosensitive drum 11 is measured in an environment with the temperature of 25 degrees Celsius (° C.) and the relative humidity of 50%. First, as illustrated in FIG. 12A, while rotating the photosensitive drum 11 at the circumferential speed (surface speed) of 151 mm/s, the charging voltage $V_{CH}$ of $-1000$ volts is applied to the charging roller 12, so as to charge the surface of the photosensitive drum 11. The charging voltage $V_{CH}$ $-1000$ volts corresponds to the surface potential of the photosensitive drum 11 of $-420\pm30$ volts. The circumferential speed of 151 mm/s of the photosensitive drum corresponds to the printing speed for plain paper in the image formation apparatus 1.

The surface of the photosensitive drum 11 charged by the charging roller 12 is exposed by the exposure head 21 at an exposure amount Q of 0.13 to 0.34 µJ/cm2. At this time, a distance D1 between the exposure head 21 and the surface of the photosensitive drum 11 is set to 10 mm. Then, 10 seconds after the photosensitive drum 11 started to rotate, the surface potential V0 of the photosensitive drum 11 is measured by the electrometer 80 having the probe disposed at the position corresponding to the position of the development roller 13. This condition is defined as a first condition.

Note that the unit (µJ/cm2) expressing the exposure amount Q of the exposure head 21 corresponds to an energy input per unit area to the LED of the exposure head 21. Therefore, the exposure amount Q may be referred to as an exposure energy.

Within 5 seconds after the end of the measurement under the first condition, as illustrated in FIG. 12B, the transfer voltage $V_{TR}$ of +2850 V starts to be applied to the transfer roller 31 for 406 seconds, while the photosensitive drum 11 is rotated at the circumferential speed of 73 mm/s and the charging voltage $V_{CH}$ ($-1000$ V) is kept applied by the charging roller 12. The exposure by the exposure head 21 is not performed at this time. This condition is defined as a second condition.

Note that 406 seconds is the time equivalent to printing 100 sheets of media M, and the circumferential speed of 73 mm/s of the photosensitive drum corresponds to the printing speed for waterproof paper in the image formation apparatus 1. In order to make the second condition a more severe condition (a condition in which a strong transfer history is more likely to occur), the circumferential speed of the photosensitive drum 11 is set slower in the second condition than that in the first condition, so that the positive charges is more easily accumulated due to the strong current flowing through the photosensitive drum 11.

Within 5 seconds after the end of application of the charging voltage $V_{CH}$ and the transfer voltage $V_{TR}$ under the second condition, measurement of the surface potential of the photosensitive drum 11 is started again under the above-mentioned first condition (FIG. 12A). The surface potential of the photosensitive drum 11 at this time is referred to as V1.

Specifically, as illustrated in FIG. 12A, while the photosensitive drum 11 is rotated at the circumferential speed (surface speed) of 151 mm/s, the charging voltage $V_{CH}$ of $-1000$ V is applied to the charging roller 12 to uniformly charge the surface of the photosensitive drum 11. The surface of the photosensitive drum 11, which is uniformly charged by the charging roller 12, is exposed at the exposure amount Q of 0.13 to 0.34 µJ/cm2. Then, when ten seconds passed after the photosensitive drum 11 started to rotate, the surface potential V1 of the photosensitive drum 11 is measured by the electrometer 80 having the probe disposed at the position corresponding to the position of the development roller 13.

Based on the surface potential V0 of the photosensitive drum 11 measured before the application of the transfer voltage and the surface potential V1 of the photosensitive drum 11 measured after the application of the transfer voltage for 406 seconds, a light attenuation change rate $\Delta V$ (%) is determined by the following equation. $\Delta V = \{1-(V1/V0)\} \times 100$ (Print Test)

The photosensitive drum 11 whose light attenuation change rate $\Delta V$ is measured is incorporated into the cyan image formation unit 10C of the image formation apparatus 1 illustrated in FIG. 1, and continuous printing is performed.

As the image formation apparatus 1, an LED printer C844dnw manufactured by Oki Electric Industry Co., Ltd. is used. 100 sheets of A4 size waterproof paper ("Laser Peach WETY-145" manufactured by Daio Paper Co., Ltd.: the volume resistivity $1 \times 1015\Omega$ or more) are conveyed in a longitudinal feeding manner, to continuously print a blank pattern thereon. That is, the number of sheets printed is 100. The reason for printing the blank pattern is to eliminate an influence of the toner on the occurrence of the strong transfer history.

After the continuous printing, one sheet of A4 size plain paper ("Excellent White" manufactured by Oki Electric Industry Co., Ltd.: volume resistivity of $7.109\Omega$) is conveyed in a traverse feeding manner, to print a half-tone test pattern using cyan toner thereon. A printing rate (duty ratio) of the test pattern is 40%, and the number of sheets printed is one. The printed test pattern is visually inspected to determine whether or not there is a density step due to a strong transfer history.

The reason for conducting the print test using the cyan image formation unit 10C is that, among the image formation units 10K, 10Y, 10M, and 10C, the cyan image formation unit 10C is located on the most downstream position, and therefore the transfer voltage for the cyan image formation unit 10C is set highest taking into account the charging of the medium M.

Examples

A total of 10 types, that is, Examples 1 to 5 and Comparative Examples 1 to 5, of the photosensitive drums 11 are prepared, and the light attenuation change rate $\Delta V$ for each of the 10 types is measured by the method described with reference to FIGS. 12A and 12B.

The photosensitive drums 11 of Examples 1 to 5 and Comparative Examples 1 to 5 have the same structure except for the composition of the charge transport layer 113. An electron transport material is added to the charge transport layer 113 of the photosensitive drum of each of Examples 1 to 5, and no electron transport material is added to the charge transport layer 113 of the photosensitive drum of each of Comparative Examples 1 to 5.

In each of the photosensitive drums 11 of Examples 1 to 5 and Comparative Examples 1 to 5, the exposure amount Q of the exposure head 21 illustrated in FIG. 12A is changed to four values: 0.13, 0.20, 0.27, and 0.34 µJ/cm2.

The photosensitive drum 11 of each of Examples 1 to 5 and Comparative Examples 1 to 5 is mounted on the cyan image formation unit 10C of the image formation apparatus 1, and the exposure amount Q of the exposure head 21 is changed to the four values, and the above-mentioned print test (the continuous printing on the 100 sheets of waterproof paper and the printing on the one sheet of plain paper) is conducted.

In the print test, as described above, after the continuous printing on the 100 sheets of waterproof paper, the halftone test pattern is printed on the one sheet of plain paper, and the printed test pattern is visually observed to determine the presence or absence of a density step.

In any of Examples 1 to 5 and Comparative Examples 1 to 5, if no density step is observed at any of the four exposure amounts Q, the evaluation result is determined to be excellent. If a density step is observed at any of the four exposure amounts Q and the density step is not at an easily visible level, the evaluation result is determined to be good (○). If a density step is observed at any of the four exposure amounts Q, and the density step is at an easily visible level, the evaluation result is determined to be poor.

FIG. 13 is a table illustrating the measurement result of the light attenuation change rate and the evaluation result of the print test of each of Examples 1 to 5 and Comparative Examples 1 to 5.

In each of Examples 1 to 5 and Comparative Examples 1 to 5, as the exposure amount Q increases, the light attenuation change rate ΔV also generally increase.

As can be seen from FIG. 13, in each of Examples 1 and 2, no density step is observed regardless of the exposure amount Q, and the evaluation result is thus excellent. In each of Examples 3 to 5, a density step is observed depending on the value of the exposure amount Q but is not in an easily visible level, and thus the evaluation result is good (○).

To the contrary, in each of Comparative Examples 1 to 5, a density step is observed depending on the value of the exposure amount Q and is in an easily visible level, and thus the evaluation result is poor (x).

Figure 14:
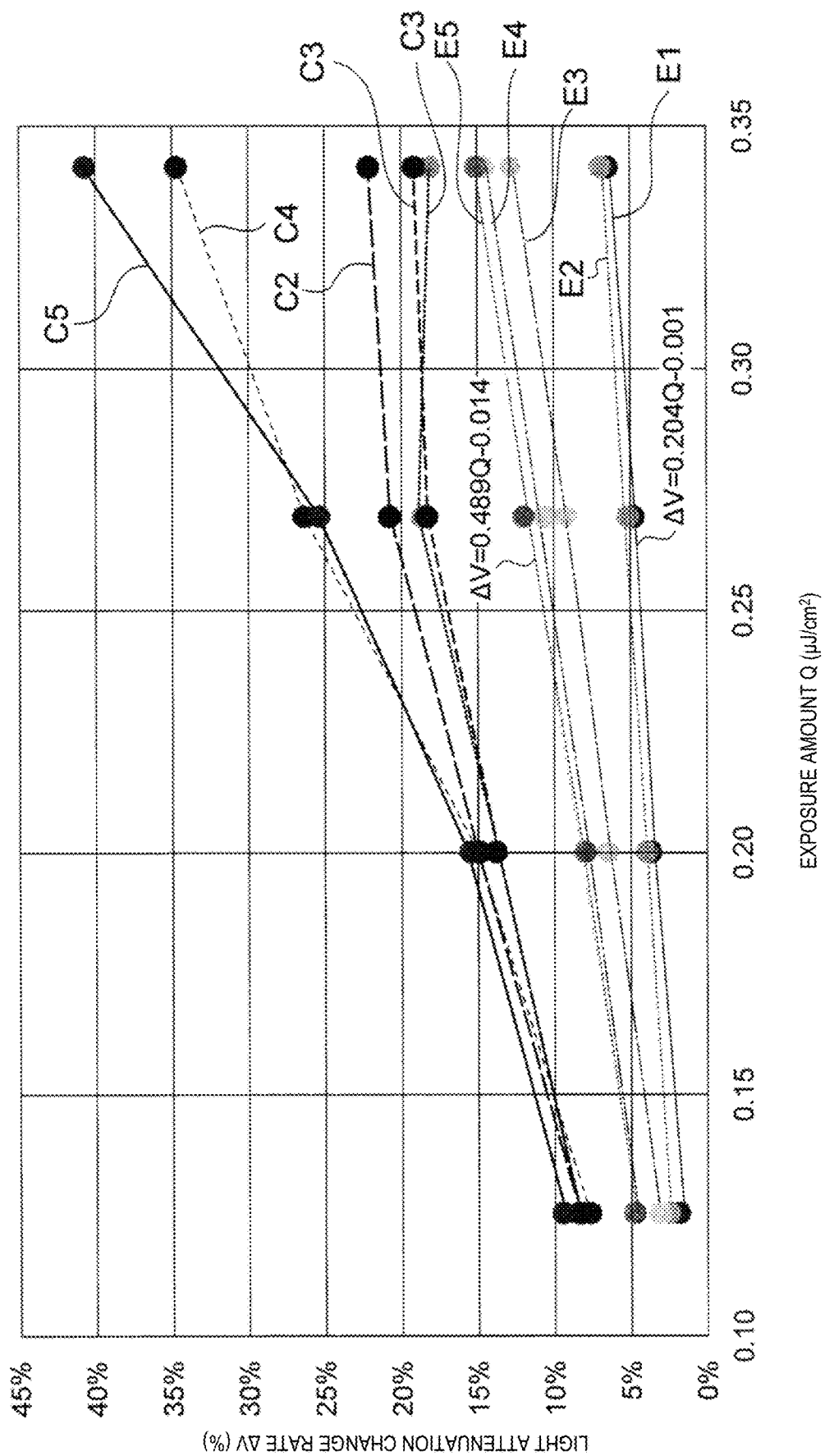
FIG. 14 is a graph illustrating a relationship between the exposure amount on the photosensitive drum and the light attenuation change rate according to each of Examples 1 to 5 and Comparative Examples 1 to 5.

FIG. 14 is a graph representing the results illustrated in FIG. 13. The horizontal axis of the graph indicates the exposure amount Q (µJ/cm2) of the exposure head 21, and the vertical axis of the graph indicates the measurement result of the light attenuation change rate ΔV (%). Lines connecting plots of Examples 1 to 5 are defined as lines E1 to E5, respectively, and lines connecting plots of Comparative Examples 1 to 5 are defined as lines C1 to C5, respectively.

As can be seen from FIG. 14, the lines E1 to E5 representing Examples 1 to 5 are located below the lines C1 to C5 representing Comparative Examples 1 to 5. That is, the light attenuation change rate ΔV in each of Examples 1 to 5 is smaller than those in Comparative Examples 1 to 5, at the same exposure amount Q.

Among the lines E1 to E5 representing Examples 1 to 5 whose evaluation results are excellent or good, the one located highest is Example 5 (the line E5) The line E5 representing Example 5 is expressed by an approximate expression: $\Delta V = 0.489 E - 0.014$.

That is, when the line representing the relationship between the exposure amount Q and the light attenuation change rate ΔV is located on the line E5 or in an area below the line E5, that is, when the equation: $\Delta V \leq 0.489 \times Q - 0.014$ is satisfied, the evaluation result is excellent or good.

From this result, when the exposure amount Q (0.13 to 0.34 µJ/cm2) of the exposure head 21 and the light attenuation change rate ΔV satisfy the equation of $\Delta V \leq 0.489 \times Q - 0.014 (\%)$, an occurrence of a density step is suppressed.

Among the lines E1 and E2 representing Examples 1 and 2, which have the excellent evaluation results, the line E2 is located higher. The line E2 representing Example 2 is expressed by an approximate expression: $\Delta V = 0.204 \times Q - 0.001$.

From this result, when the exposure amount Q (0.13 to 0.34 µJ/cm2) of the exposure head 21 and the light attenuation change rate ΔV satisfy the equation of $\Delta V \leq 0.204 \times Q - 0.001 (\%)$, an occurrence of a density step is most effectively suppressed.

In other words, when the exposure amount Q of the exposure head 21 and the light attenuation change rate ΔV satisfy the equation of $\Delta V \leq 0.489 \times Q - 0.014 (\%)$ (more preferably $\Delta V \leq 0.204 \times Q - 0.001 (\%)$), even if a high transfer voltage is applied to the photosensitive drum 11, accumulation of positive charges is unlikely to occur so as to suppress a density step and thus to reduce printing defects.

Further, when the drum unit 20 according to an embodiment is used, it is not necessary to perform special exposure processing as in Patent Document 1, for example, and thus it becomes possible to handle a wide variety of media.

(Contact Area Between Photosensitive Drum and Transfer Roller)

Figure 15A:
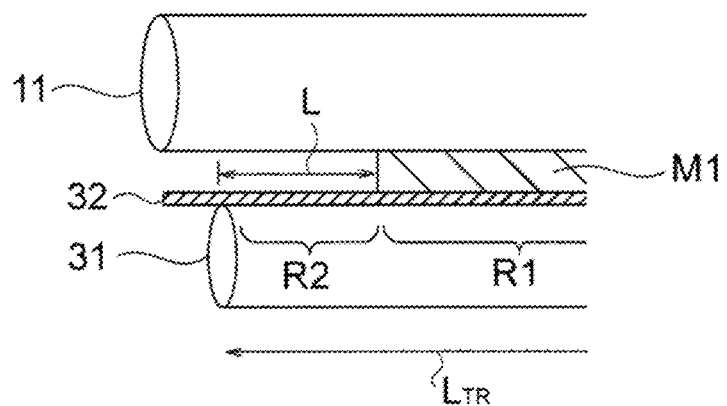
FIGS. 15A and 15B are schematic diagrams illustrating a transfer nip between the photosensitive drum and the transfer roller.

By using the image formation apparatus 1 equipped with the drum unit 20 according to an embodiment, printing defects due to the strong transfer history are suppressed, so it become possible to perform printing on a wider medium (that is, a medium that causes the out-of-medium region R2 to be narrow). This point will be further described below FIG. 15A is a schematic diagram illustrating the photosensitive drum 11, the transfer roller 31, and the transfer belt 32. A width of each of the out-of-medium regions R2 in the axial direction of the photosensitive drum 11 (the X direction illustrated in FIG. 2) is assumed to be L mm.

Figure 15B:
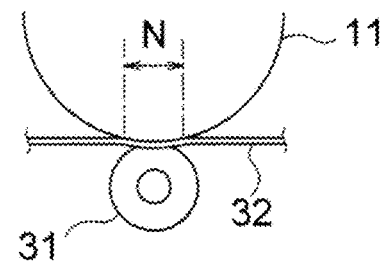

FIG. 15B is a schematic diagram illustrating a nip portion between the photosensitive drum 11 and the transfer roller 31. A length of the nip portion (nip length) between the photosensitive drum 11 and the transfer roller 31 in the conveyance direction of the medium M (the Y direction illustrated in FIG. 2) is assumed to be N mm. Note that the nip length N can be measured using a pressure sheet (sensor sheet) and is also referred to as a nip width.

In an embodiment, an axial length LTR (FIG. 15A) of a roller portion of transfer roller 31 is 301 mm, and the nip length N (FIG. 15B) between photosensitive drum 11 and transfer roller 31 is 1.51 mm.

The total area of the out-of-medium regions R2 on both sides of the medium M in the width direction is assumed to be S. By using the width L of the out-of-medium region R2 and the nip length N, the total area S of the out-of-medium regions R2 is expressed as $S = 2 \times N \times L$ (mm$^2$).

For each of four types of media (Media 1, 2, 3, and 4) whose widths are different from one another, after applying the transfer voltage of +2850 volts to the photosensitive drum 11 for 406 seconds using the method described with reference to FIGS. 12A and 12B, the surface potential of the photosensitive drum 11 is measured with the electrometer 80.

Table 1 indicates, for each of Media 1, 2, 3, and 4, the total area S (mm$^2$) of the out-of-medium regions R2 and the surface potential (V) of the photosensitive drum 11 after the application of the transfer voltage, measured by the method described with reference to FIGS. 12A and 12B.

TABLE 1

| MEDIUM | AREA OF OUT-OF-MEDIUM REGIONS R2 | DRUM SURFACE POTENTIAL (V) IN OUT-OF-MEDIUM REGIONS R2 |
|---|---|---|
| MEDIUM 1 | 47 | +619 |
| MEDIUM 2 | 138 | +501 |
| MEDIUM 3 | 297 | +252 |
| MEDIUM 4 | 376 | +181 |

Note that Medium 1 is waterproof paper having a length of 270 mm and a width of 210 mm, which is obtained by cutting A4 size (length: 297 mm, width: 210 mm) waterproof paper, and is conveyed in the traverse feeding manner along the conveyance direction. Medium 2 is A4 size (length: 297 mm, width: 210 mm) waterproof paper, and is conveyed in the longitudinal feeding manner along the conveyance direction. Medium 3 is waterproof paper having a length of 297 mm and a width of 105 mm, which is obtained by cutting A4 size (length: 297 mm, width: 210 mm) waterproof paper, and is conveyed in the longitudinal feeding manner along the conveyance direction. Medium 4 is waterproof paper having a length of 297 mm and a width of 52.5 mm, which is obtained by cutting A4 size (length: 297 mm, width: 210 mm) waterproof paper into ¼ size thereof in the widthwise direction, and is conveyed in the longitudinal feeding manner along the conveyance direction.

Figure 15C:
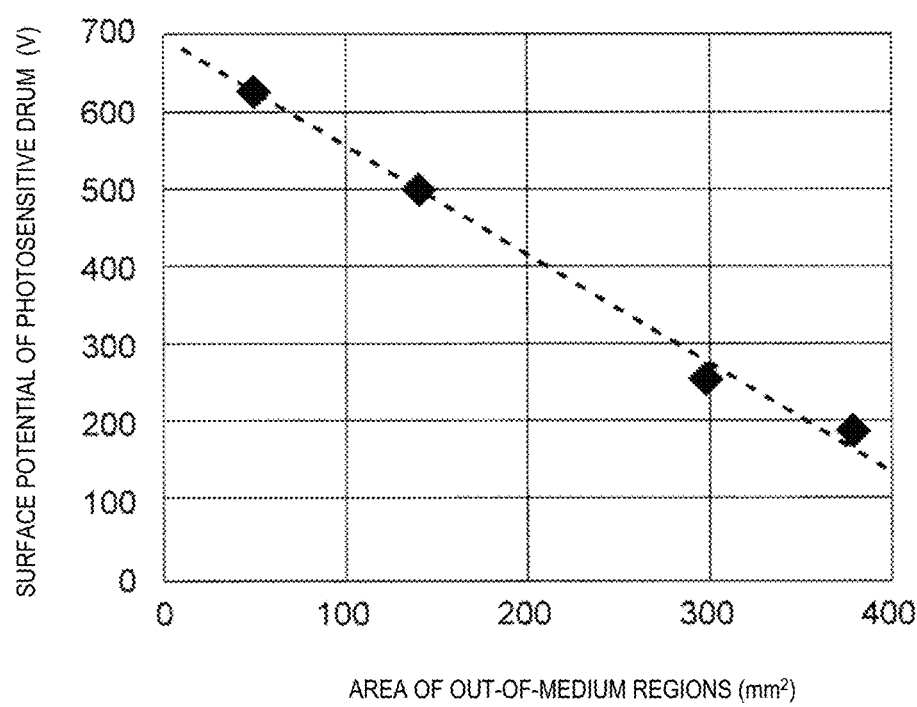
FIG. 15C is a graph illustrating a relationship between a total area of out-of-medium regions and a surface potential of the photosensitive drum.

FIG. 15C is a graph illustrating a relationship between the total area of the out-of-medium regions R2 and the surface potential of the photosensitive drum 11 after the transfer voltage has been applied for 406 seconds. The horizontal axis of the graph indicates a contact area (mm$^2$) between the photosensitive drum 11 and the transfer roller 31, and the vertical axis of the graph indicates the surface potential (V) of the photosensitive drum 11.

The smaller the total area S of the out-of-medium regions R2, the higher the surface potential of the photosensitive drum 11 after the application of the transfer voltage. This is because the smaller the total area S of the out-of-medium regions R2, the more concentrated the current flowing from the transfer roller 31 to the photosensitive drum 11 during the transfer.

Regardless of which of Media 1 to 4 is used, when the exposure amount Q of the exposure head 21 and the light attenuation change rate ΔV satisfy the equation: $\Delta V \leq 0.489 \times Q - 0.014 (\%)$, an occurrence of a density step in a print image is suppressed, and thus a printing defect is suppressed.

That is, by using the image formation apparatus 1 equipped with the drum unit 20 according to an embodiment, it is possible to suppress an occurrence of a printing defect even if the total area of the out-of-medium regions R2 is in a range of 47 to 376 mm$^2$.

In the above description, the case has been described in which the charging voltage of the negative polarity (first polarity) is applied to the photosensitive drum 11 by the charging roller 12, and the transfer voltage of the positive polarity (second polarity) is applied to the transfer roller 31.

However, an embodiment is not limited to thereto. For example, the charging voltage of the positive polarity may be applied to the photosensitive drum 11 by the charging roller 12, and the transfer voltage of the negative polarity may be applied to the photosensitive drum 11 by the transfer roller 31. In this case as well, when the exposure amount Q of the exposure head 21 and the light attenuation change rate ΔV satisfy the equation: $\Delta V \leq 0.489 \times Q - 0.014 (\%)$, an occurrence of a density step in a print image can be suppressed and a printing defect can be suppressed.

Further, in the above description, the case has been described in which the transfer unit 30 includes the transfer roller 31, the transfer belt 32, the drive roller 33, and the driven roller 34. However, in a case of an image formation apparatus that prints a monochrome image, it is sufficient that the transfer unit 30 includes the transfer roller 31 in contact with the photosensitive drum 11.

Note that in an embodiment, the photosensitive drum 11 having the outer diameter of 30.0 mm is used, however, the same effect is obtained when the photosensitive drum 11 has the outer diameter of 30.0±0.2 mm, which is a range of manufacturing errors (variations).

(Effects)

As described above, V0 (volts) is the surface potential of the photosensitive drum 11 that is measured under the first condition, wherein the first condition is to expose the surface of the photosensitive drum 11 at the exposure amount Q in the range of 0.13 to 0.34 μJ/cm2 while rotating the photosensitive drum 11 at the circumferential speed of 151 mm with the surface of the photosensitive drum 11 being charged with the voltage (the charging voltage $V_{CH}$) having the absolute value of 1000 volts and the first polarity. V1 (volts) is the surface potential of the photosensitive drum 11 that is measured under the first condition again after applying for 406 seconds the voltage (the transfer voltage $V_{TR}$) having the absolute value of 2850 volts and the second polarity opposite to the first polarity to the surface of the photosensitive drum 11 that has been measured under the first condition while rotating the photosensitive drum 11 at the circumferential speed of 73 (mm/s). The drum unit 20 according to an embodiment satisfies the following equation: $\Delta V \leq 0.489 \times Q - 0.014 (\%)$, where ΔV is expressed as $\Delta V = \{1 - (V1/V0)\} \times 100 (\%)$.

Therefore, even if a high transfer voltage is applied to the photosensitive drum 11, accumulation of positive charges on the photosensitive drum 11 is suppressed, which suppresses an occurrence of a density step and thus an occurrence of a printing defect. In addition, since there is no need for a special exposure process as in, for example, Japanese Patent Application Publication No. 2003-233999, the drum unit 20 according to an embodiment can handle a variety of media.

In particular, when the equation: $\Delta V \leq 0.489 \times Q - 0.014 (\%)$ is satisfied, it is possible to more effectively suppress the occurrence of the density step and thus improve the print quality.

The disclosure can be used for any image formation apparatus that forms an image on a medium, such as a printer, a copier, a facsimile machine, and an MFP (Multi Function Peripheral).

Although one or more embodiments have been described above, the disclosure is not limited thereto, and various improvements or modifications can be made.

Aspects of the disclosure may be described below as appendices.

(Aspect 1) A drum unit that may include a photosensitive drum and a frame that holds the photosensitive drum. An equation of $\Delta V \leq 0.489 \times Q - 0.014 (\%)$ is satisfied, where $\Delta V = \{1 - (V1/V0)\} \times 100 (\%)$, wherein V0 (volts) is a surface potential of the photosensitive drum that is measured under a first condition, the first condition being to expose a surface of the photosensitive drum at an exposure amount Q in a range of 0.13 to 0.34 μJ/cm2 while the photosensitive drum is rotated at the circumferential speed of 151 mm/s with the surface of the photosensitive drum being charged with a voltage having an absolute value of 1000 volts and a first polarity, and wherein V1 (volts) is a surface potential of the photosensitive drum that is measured under the first condition again after the surface of the photosensitive drum that has been measured under the first condition is applied for 406 seconds with a voltage having an absolute value of 2850 volts and a second polarity opposite to the first polarity while the photosensitive drum is rotated at the circumferential speed of 73 mm/s.

(Aspect 2) The drum unit according to Aspect 1, wherein the equation of $\Delta V \leq 0.204 \times Q - 0.001(\%)$ is satisfied.

(Aspect 3) The drum unit according to Aspect 1 or Aspect 2, wherein the first polarity is a negative polarity, and the second polarity is a positive polarity.

(Aspect 4) The drum unit according to any one of Aspects 1 to 3, wherein when the voltage having the absolute value of 1000 volts and the first polarity is applied, an absolute value of the surface potential of the photosensitive drum is 420±30 volts.

(Aspect 5) The drum unit according to any one of Aspects 1 to 4, wherein in a first circumferential direction about an rotation axis of the photosensitive drum, an exposure position where the surface of the photosensitive drum is exposed with light is located at 44.0 degrees from a reference position, which is a charging position where the surface of the photosensitive drum is charged, a measurement position where the surface potential V0 and the surface potential V1 of the photosensitive drum are measured is located at 97.6 degrees from the reference position, and an voltage applying position where the surface of the photosensitive drum is applied with the voltage is located at 224.0 degrees from the reference position.

(Aspect 6) The drum unit according to any one of Aspects 1 to 5, wherein a photosensitive layer of the photosensitive drum includes a charge transport layer and a charge generation layer, and the charge transport layer contains an electron transport substance.

(Aspect 7) An image formation apparatus that includes: the drum unit according to any one of Aspects 1 to 6; a charging member in contact with the surface of the photosensitive drum and configured to apply a voltage; an exposure device configured to expose the surface of the photosensitive drum with light; and a transfer member in contact with the surface of the photosensitive drum and configured to apply a voltage.

(Aspect 8) The image formation apparatus according to Aspect 7, wherein a transfer nip is formed between the photosensitive drum and the transfer member such that a medium is to pass through the transfer nip, and an area of out-of-medium regions is in a range of 47 to 376 mm$^2$, where the out-of-medium regions are regions of the photosensitive drum where the photosensitive drum faces the transfer member without the medium therebetween.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A drum unit comprising:
a photosensitive drum; and a frame that holds the photosensitive drum, wherein
an equation of $\Delta V \leq 0.489 \times Q - 0.014$ (%) is satisfied, where $\Delta V = \{1-(V1/V0)\} \times 100$ (%),
wherein V0 is a surface potential of the photosensitive drum that is measured under a first condition, the first condition being to expose a surface of the photosensitive drum at an exposure amount Q in a range of 0.13 to 0.34 μJ/cm$^2$ while the photosensitive drum is rotated at a circumferential speed of 151 mm/s with the surface of the photosensitive drum being charged with a voltage having an absolute value of 1000 volts and a first polarity, and wherein V1 is a surface potential of the photosensitive drum that is measured under the first condition again after the surface of the photosensitive drum that has been measured under the first condition is applied for 406 seconds with a voltage having an absolute value of 2850 volts and a second polarity opposite to the first polarity while the photosensitive drum is rotated at the circumferential speed of 73 mm/s.

2. The drum unit according to claim 1, wherein the equation of $\Delta V \leq 0.204 \times Q - 0.001(\%)$ is satisfied.

3. The drum unit according to claim 1, wherein the first polarity is negative polarity, and the second polarity is positive polarity.

4. The drum unit according to claim 1, wherein when the voltage having the absolute value of 1000 volts and the first polarity is applied, an absolute value of the surface potential of the photosensitive drum is 420±30 volts.

5. The drum unit according to claim 1, wherein in a first circumferential direction about an rotation axis of the photosensitive drum, an exposure position where the surface of the photosensitive drum is exposed with light is located at 44.0 degrees from a reference position, which is a charging position where the surface of the photosensitive drum is charged, a measurement position where the surface potential V0 and the surface potential V1 of the photosensitive drum are measured is located at 97.6 degrees from the reference position, and an voltage applying position where the surface of the photosensitive drum is applied with the voltage is located at 224.0 degrees from the reference position.

6. The drum unit according to claim 1, wherein a photosensitive layer of the photosensitive drum includes a charge transport layer and a charge generation layer, and the charge transport layer contains an electron transport substance.

7. An image formation apparatus comprising:
the drum unit according to claim 1;
a charging member in contact with the surface of the photosensitive drum and configured to apply a voltage; an exposure device configured to expose the surface of the photosensitive drum with light; and a transfer member in contact with the surface of the photosensitive drum and configured to apply a voltage.

8. The image formation apparatus according to claim 7, further comprising:
a transfer nip that is formed between the photosensitive drum and the transfer member and through which a medium passes, wherein an area of out-of-medium regions is in a range of 47 to 376 mm$^2$, where the out-of-medium regions are regions of the photosensitive drum where the photosensitive drum faces the transfer member without the medium therebetween.

* * * * *